US012553865B2

(12) United States Patent
Subbotin et al.

(10) Patent No.: US 12,553,865 B2
(45) Date of Patent: Feb. 17, 2026

(54) AGILE UNDT DEVICE COMPRISING A DUAL EMATs/LASER-PULSE MATRIX ARRAY FOR SCANNING METALLURGICAL OBJECTS

(71) Applicant: STEELEMAT S.À R.L, Luxembourg (LU)

(72) Inventors: Artemii Subbotin, Odintsovo (RU); Sergii Malynka, Dnipro (UA); Georgii Sidorov, Slavutich (UA); Alexey Evdokimov, Mechnikovo (RU)

(73) Assignee: STEELEMAT S.A R.L (LU)

( * ) Notice: Subject to any disclaimer, the term of this patent is extended or adjusted under 35 U.S.C. 154(b) by 0 days.

(21) Appl. No.: 18/276,060

(22) PCT Filed: Mar. 14, 2022

(86) PCT No.: PCT/IB2022/052251
§ 371 (c)(1),
(2) Date: Aug. 7, 2023

(87) PCT Pub. No.: WO2022/172260
PCT Pub. Date: Aug. 18, 2022

(65) Prior Publication Data
US 2024/0102969 A1 Mar. 28, 2024

(51) Int. Cl.
*G01N 29/24* (2006.01)
*G01N 29/04* (2006.01)
(Continued)

(52) U.S. Cl.
CPC ....... *G01N 29/2418* (2013.01); *G01N 29/043* (2013.01); *G01N 29/221* (2013.01);
(Continued)

(58) Field of Classification Search
None
See application file for complete search history.

(56) References Cited

U.S. PATENT DOCUMENTS

| 2010/0046953 A1 | 2/2010 | Shaw et al. |
| 2012/0103097 A1 | 5/2012 | Lopez Jauregui |
(Continued)

FOREIGN PATENT DOCUMENTS

| CN | 203465240 U | 3/2014 |
| CN | 110108795 B | 8/2020 |
(Continued)

OTHER PUBLICATIONS

Dixon S et al. "Detection of cracks in metal sheets using pulsed laser generated ultrasound 1-6. 11-16 and EMAT detection" Ultrasonics, IPC Science and Technology Press Ltd. Guildford, GB, vol. 51, No. 1, Jan. 1, 2011 (Jan. 1, 2011), pp. 7-16, ISSN: 0041-624X, XP027415340.

(Continued)

*Primary Examiner* — Suman K Nath
(74) *Attorney, Agent, or Firm* — Jose Cherson Weissbrot

(57) ABSTRACT

A UNDT Device (1) comprising a dual EMAT/laser-pulse matrix array for scanning ultrasonically and for identifying discontinuities (D) in a conductive metal object (2), which device comprises a) a Pulsed Laser Input Source (4) that produces a Pulsed Laser Input Beam (ILB); b) a Matrix Multi Beams Laser Transmitter comprising i) mechanical Beam-Steering Means (17, 17a) configured to be struck by the Laser Input Beam (ILB) and to periodically diffract it into Secondary Laser Beams (18, 18a, 18b, 18c); and ii) Mechanical Beam-Leaping Means (19) intended to be struck by the Secondary Laser Beams and to periodically diffract them into n Pulsed Laser Output Beams (OLBk) and to focus these onto n Pulse Points (SPk) located at the centre of n Pulse Cells (EPk) of a periodic Laser Pulses Array (LEA); and c) a Receivers Assembly (SE) made up of EMAT Receivers (Emi) that are organised into n Sensors Groups (SGi) that are arranged in n Detection Cells (RWi) of a (Continued)

periodic EMAT Receivers Array (ERA). The Spatial Periodicities (8, 7) and the dimensions (n) of the Laser Pulses Array (LEA) and of the EMAT Receivers Array (ERA) are equal.

5 Claims, 16 Drawing Sheets

(51) Int. Cl.
- *G01N 29/22* (2006.01)
- *G01N 29/26* (2006.01)
- *G01N 29/06* (2006.01)

(52) U.S. Cl.
CPC ......... *G01N 29/2412* (2013.01); *G01N 29/26* (2013.01); *G01N 29/0645* (2013.01); *G01N 2291/0234* (2013.01); *G01N 2291/0289* (2013.01); *G01N 2291/103* (2013.01); *G01N 2291/106* (2013.01)

(56) References Cited

U.S. PATENT DOCUMENTS

| | | | | |
|---|---|---|---|---|
| 2012/0204648 | A1* | 8/2012 | Wang | G02B 21/36 |
| | | | | 359/305 |
| 2019/0331757 | A1* | 10/2019 | Motzer | G01S 3/801 |
| 2024/0085379 | A1* | 3/2024 | Arabul | G01N 29/043 |

FOREIGN PATENT DOCUMENTS

| | | |
|---|---|---|
| NL | 2018403 B1 | 9/2018 |
| WO | 1991017009 A1 | 11/1991 |

OTHER PUBLICATIONS

Mirko Sgarbi et al. "Pre-processing of data coming from a laser-EMAT system for nondestructive testing of steel slabs" ISA Transactions, Instrument Society of America. Pittsburgh, US, vol. 51, No. 1, Jul. 27, 2011 (Jul. 27, 2011), pp. 181-188, [retrieved on Aug. 3, 2011] DOI: 10.1016/J.ISATRA.2011.07.004.

Boonsang S et al. "Signal enhancement in Rayleigh wave interactions using a laserultrasound/EMAT imaging system" Ultrasonics, IPC Science and Technology Press Ltd. Guildford, GB, vol. 43, No. 7, Jun. 1, 2005 (Jun. 1, 2005), pp. 512-523, [retrieved on Jun. 1, 2005] ISSN: 0041-624X, XP027612784.

Cuixiang Pei et al. "A study of internal defect testing with the laser-EMAT ultrasonic method" IEEE Transactions on Ultrasonics, Ferroelectrics, and Frequency Control, IEEE, USA, vol. 59, No. 12, Dec. 1, 2012 (Dec. 1, 2012), pp. 2702-2708 DOI: 10.1 109/TUFFC.2012.2511 ISSN: 0885-3010, XP011491558.

Yashiro et al. "A novel technique for visualizing ultrasonic waves in general solid media by pulsed laser scan" NDT &E International, Elsevier, Amsterdam, NL, vol. 41, No. 2, Dec. 5, 2007 (Dec. 5, 2007), pp. 137-144 DOI: 10.1016/J.NDTEINT.2007.08.002 ISSN: 0963-8695, XP022375644.

\* cited by examiner

AGILE UNDT DEVICE COMPRISING A DUAL EMATs/LASER-PULSE MATRIX ARRAY FOR SCANNING METALLURGICAL OBJECTS

TECHNICAL FIELD

This invention relates generally to non-destructive ultrasonic testing (UNDT) technology for investigating discontinuities in objects in the metallurgical industry. Specifically, it pertains to an Agile Dual Matrix EMATs/Laser-Pulse UNDT Device for scanning metallurgical objects, its implementation methods, and industrial applications.

The invention specifically relates to the technological class of non-destructive testing (NDT) in the metallurgical industry for investigating or analysing the material of a metallurgical object using ultrasonic waves, also known as acoustic waves. As such, the invention falls within the international patent class Int. Cl. G01N 29 for UNDT investigations.

The invention particularly pertains to this subclass of UNDT investigations applied in the metallurgical industry, using non-vibrating type transducers. They do not mechanically vibrate but induce and/or receive ultrasonic mechanical vibrations through electromagnetic means. The implemented method involves studying or analysing materials using suitable emitting and/or receiving means to induce ultrasonic waves in a conductive test body or to receive ultrasonic waves from the test body for testing purposes, through electromagnetic means. This enables the visualization of the interior of objects by transmitting and/or receiving such emitted ultrasonic waves through the object. As such, the invention falls within the international patent class Int. Cl. G01N 29/24 and/or the United States patent class U.S Cl. 73/643.

The technology of the invention specifically relates to a hybrid Laser-EMATs-UNDT device with a dual matrix (LEAUNDT) for the scanning of metallurgical objects, implementing a technique that combines a) emission of ultrasonic mechanical vibrations through pulsed laser beams, and b) reception of ultrasonic mechanical vibrations by a multitude of electromagnetic acoustic transducers known as EMATs operating in reception mode.

PRIOR ART

The detection and characterization of defects in metallurgical products are commonly performed using non-destructive ultrasonic testing (UNDT) systems.

Conventional non-destructive piezoelectric ultrasonic testing (CUNDT) using ultrasonic waves to locate and size potentially critical discontinuities such as cracks and internal defects in metallurgical products has become a widely used industrial tool. CUNDT methods employ short-wavelength, high-frequency mechanical wave beams transmitted through the tested material by an ultrasonic wave emitting probe (UWE) and detected by the same or a different ultrasonic wave receiving probe (UWR). This is done to identify structural defects in the product. Since this CUNDT technique uses piezoelectric transducers, it requires intimate surface contact and the use of a coupling fluid. Therefore, the conventional CUNDT technique has the major drawback that it can hardly be used on surfaces at high temperatures or under challenging conditions. Generally, the conventional piezoelectric CUNDT technique cannot operate at temperatures above 100° C.

An alternative to the CUNDT technique described in the prior art is the electromagnetic acoustic transducer (EMAT) method based on a magnetic coupling mechanism. Sound waves are generated in the material, and not by contacting the surface of the test material. EMATs offer significant advantages over piezoelectric CUNDT transducers. An EMAT can generate, as a UWE emitter, and/or receive, as a UWR receiver, various modes of ultrasonic waves in conductive materials without physical contact and without using liquid coupling with the test pieces. Such contactless and coupling-free characteristics improve test reliability. Furthermore, the physical properties of the ultrasonic wave transmission path do not change due to contact. Moreover, the required tolerance specifications for the position and propulsion of the test products relative to the EMAT probes are quite loose. This makes EMAT probes particularly well-suited for industrial applications such as those involving medium-temperature inspection (up to 600° C.) and poor surface conditions of the test pieces.

There are two main basic components in an EMAT operating as either a UWE emitter and/or a UWR receiver. One is a magnet, and the other is an HF electrical coil circuit. The magnet can be a permanent magnet or an electromagnet, producing a static or quasi-static magnetic field. The electrical coil circuit is traversed by an HF current. It either emits as a UWE emitter or is induced as a UWR receiver by a high-frequency magnetic field. The EMAT phenomenon is reversible. Therefore, the same EMAT probe can be used either as a UWE emitter of ultrasonic waves towards an inspected material when electrically activated in its HF electrical coil circuit to induce ultrasonic vibrations, and/or as a UWR receiver receiving variations and disturbances of the electromagnetic field caused by the propagation of ultrasonic waves in the material, or in a combination of both operating modes. The prior art uses EMATs in a wide range of applications, including measuring the thickness of metal products, detecting pipeline and rail defects, and detecting local defects in steel products, etc.

EMAT UNDT technology has long been used in the prior art, either in dual pulse/echo mode using a single UWE-UWR EMAT or in mixed pitch-catch mode coupling an EMAT acting as an UWE emitter or a UWR receiver in combination with another UNDT device of a different type acting complementarily as a UWR receiver or an UWE emitter.

An EMAT is known in the prior art as a low-efficiency UWE emitter of ultrasonic waves but as a rather efficient UWR receiver of ultrasonic waves.

Another alternative to the CUNDT technique described in the prior art is laser ultrasonic non-destructive testing (LUNDT). It combines a pulsed laser emitter (LUWE) and an interferometric laser receiver (LUWR). If such a LUNDT system could be practically implemented, it would provide means for contactless and remote ultrasonic testing. Indeed, on the one hand, a pulsed laser can be effectively used as a UWE emitter of ultrasonic waves in a metallurgical product. This is because the power of a pulsed laser beam, focused at a point on the surface of a metallurgical product, causes rapid thermal expansion (thermoelastic generation), ablation, and plasma micro-explosion of the material at the product's surface, generating shock waves. This induces powerful and efficient UW ultrasonic waves in the body of the object. Unfortunately, interferometric lasers are generally poor LUWR receivers of ultrasonic waves. Additionally, the performance of an LUWR laser receiver strongly depends on surface variations over the inspection area of a metallurgical product.

An alternative to LUNDT inspection systems based entirely on lasers is one in which the problematic LUWR laser receiver of ultrasonic waves is replaced by an electromagnetic acoustic transducer (EMAT). Ultrasonic generation by a pulsed LUWE laser emitter and ultrasonic wave detection by an EMAT UWR acoustic receiver are combined into a hybrid Laser-EMAT ultrasonic technique (HLEUNDT) for inspecting discontinuities in metallurgical products. The resulting HLEUNDT hybrid technology is still contactless from a technical standpoint. The EMAT is placed in immediate proximity to the product's surface, but it requires no coupling or special surface preparation. The EMAT can be configured to operate at high temperatures. Therefore, prior art hybrid Laser-EMAT HLEUNDT systems provide a superior combination for non-destructive ultrasonic testing of a metallurgical product without surface contact One of the main advantages of this hybrid Laser/EMAT HLEUNDT technology, in addition to being contactless, is its ability to simultaneously detect surface defects (using Rayleigh waves) and deep subsurface defects (using longitudinal and transverse waves). The use of a LUWE laser emitter, instead of an EMAT emitter, allows for the generation of different types of inclined ultrasonic waves, with a higher frequency (10 MHz) and greater intensity than what can be achieved with an EMAT emitter. Moreover, the laser impact of a laser emitter can generate ultrasonic waves at a greater depth and distance from the material surface. In contrast, the efficiency of an EMAT emitter decreases significantly with the distance from the material surface and the distance to the defects. Typically, a maximum distance of 2 to 3 mm is allowed to maintain the efficiency of an EMAT emitter. On the other hand, the use of an LUWR interferometric laser receiver to detect the returning ultrasonic waves in a metallic material is proven to be much less efficient than an EMAT receiver in terms of efficiency.

According to prior art UNDT, ultrasonic data on the topology of discontinuities in a product can be digitally processed and displayed in a variety of different formats. The most common formats are referred to as A-Scan, B-Scan, and C-Scan, or their equivalent topological representations. Each mode of presentation, A-Scan, B-Scan, and C-Scan, offers a different way of viewing and evaluating the discontinuities on and/or inside the material of the inspected product. It is customary to scan and/or display UNDT test results successively in all three presentation forms.

According to prior art UNDT, when a single ultrasonic receiver UWR is positioned at a point on the surface of the product and is induced by an ultrasonic emitter UWE, the most basic presentation of the shape data of the received ultrasonic waves, viewed, and provided by a single UWR receiver, takes the form of an A-scan displaying the shape of the received waves. In an A-scan, the amplitude of echoes and the transit time of the single UWR receiver from the discontinuities are plotted on a simple graph. The vertical axis represents the signal amplitude, and the horizontal axis represents the transit time. The sound energy from the UWE emitter is induced and propagated through the material in the form of ultrasonic waves. When there is a discontinuity in the body of the product, a portion of the wave path energy is reflected by such a reflector of the discontinuity towards the UWR receiver. The A-scan presentation displays the amount of received ultrasonic energy as a function of transit time. The relative amount of received energy is plotted along the vertical axis. The elapsed transit time, which is related to the distance travelled within the material, is displayed along the horizontal axis. In the A-scan presentation, the relative size of the discontinuities can be estimated by comparing the signal amplitude obtained from an unknown reflector of the discontinuity to that of a known reflector of the discontinuity.

According to prior art UNDT, when implementing a linear scanning of an object along a detection line on the object's surface, belonging to a traversing scanning plane, a B-scan shows a digitized cross-sectional view of the product along the scanning plane traversing the detection line. A B-scan combines multiple A-scan data provided by either i) a single UWR receiver moved in steps along a linear receiver array composed of successive receiver points along the detection line, ii) a multitude of fixed UWR receivers arranged at distant receiver points of a linear receiver array along the detection line, or iii) a single fixed UWR receiver induced by a multitude of fixed ultrasonic emitters UWE arranged at distant emitter points along a pulse line of a linear emitter array. In a B-scan, the depth of a reflector of discontinuity is displayed along the vertical axis. The linear position of either the UWR receivers (in cases i and ii above) or the UWE emitters (in case iii above) is displayed along the horizontal axis. From a B-scan, the depth of the reflectors of discontinuities and their approximate linear dimensions in the direction of the scanning line can be determined.

The C-scan presentation is a type of display that is possible when a multitude of two-dimensional B-scans are performed along successive and separate parallel detection (scanning) lines positioned perpendicular to an axis of the product. A C-scan is a plane-like view of the three-dimensional location and size of the discontinuities. The C-scan image represents a top-down view of the product parallel to the scanning pattern of the multiple detection lines. Typically, digital thresholding of the numerical data is performed on the A-scans. The relative amplitudes and/or transfer times are displayed as shades of grey colours, or numerical identifiers for each position in the plane view. The C-scan presentation provides a 3D view of the characteristics of the product's discontinuities that reflect and scatter sound waves on the surface and inside the product.

According to prior art UNDT, it is known to implement an ultrasonic Laser Pulses Array (LEA) on a product. It is also known to implement an ultrasonic EMAT Receiver Array (ERA) arranged on the product.

It is also known in the prior art of UNDT to combine ultrasonic laser transmitters and EMAT receivers in a hybrid ultrasonic UNDT device, the HLEUNDT, with dual EMAT/Laser Pulse Array matrices, including an ultrasonic Laser Pulses Array (LEA) and an ultrasonic EMAT Receivers Array (ERA).

It is known from the prior art to use a Diffractive Beam Splitter (LBS) to parallelly split an Pulsed Laser Input Beam (ILB) and its power into a bundle of n outgoing Pulsed Laser Output Beams (OLBk) focused in parallel onto n distant pulse points (EPk) of an ultrasonic Laser Pulses Array (LEA). Due to the parallel splitting, the energy of each outgoing Pulsed Laser Output Beam (OLBk) is divided by more than n.

It is also known from the prior art to use a Continuous Beams Scanner (LSS) to continuously move an Incoming Pulsed Laser Beam (ILB) into a continuous slice of Focused outgoing Pulsed Laser Output Beams (OLBk), continuously but not successively focused on various positions along a focal line passing through possibly n pulse points of an ultrasonic Laser Pulses Array (LEA). The "Beam Steering" technology generally refers to any optical element with continuous variation, including, for example, moving lenses, variable prisms, variable focal length lenses, deformable mirrors, oscillating mirrors, spatial phase modulators, etc. The most common means of continuously redirecting an Pulsed Laser Input Beam (ILB) is by reflecting it off mirrors or diffracting it using holographic gratings mounted on mechanical scanners, such as rotating prisms or oscillating mirror scanners. However, the conventional LSS technique is not suitable for efficient UNDT applications because the position and therefore the energy of the Outgoing Pulsed Laser Beams (OLBk) are continuously moving towards the material and are not focused on discrete distant Pulse Points (SPk).

Agile Matrix Laser Transmitters (ABLAT) are known in the prior art. Agile focusing of an Pulsed Laser Input Beam (ILB) involves sequentially and discontinuously diffracting it into a multitude of successive angularly distant Pulsed Laser Output Beams (OLBk) directed towards n distant dispersed Pulse Points (SPk) of an Ultrasonic Laser Pulses Array (LEA), rather than directing them towards a continuous scanning line. ABLATs are used in high-tech fields in the prior art, such as laser communications, target acquisition and tracking, laser microscopy, and interferometry. The main application areas include laser radars that require the ability to quickly point at a large number of widely spaced objects for target tracking and discrimination, as well as sensors for surveillance and tracking of space objects. Currently, they are not used or known in the prior art for UNDT applications and/or in the metallurgical industry. An example of this ABLAT technology, without the implementation of an Ultrasonic Receiver Matrix (ERA), is described in US Patent 2010/0046953 A1, Shaw et al., published on Feb. 25, 2010.

According to the prior art in UNDT, when using either a) a Pulsed Laser Input Beam source (ILB) generating ultrasonic waves at Pulse Points (SPk) of an ultrasonic Laser Pulses Array (LEA), or b) a set of EMATs organized in an EMAT Receivers Array (ERA), only the following configurations or their equivalents are known and described by the prior art:

a. Either a set of n dual EMAT probes is used, which function as both transmitters and receivers. These EMAT probes are positioned in a single EMAT array. No Pulsed Laser Input Beam source (ILB) or Laser Pulses Array (LEA) is used. A first example of a specific implementation of this UNDT/EMAT technology is described in US Patent 2012/0103097 A1, Lopez Jauregui, published on May 3, 2012. A second example of a specific implementation of this UNDT/EMAT technology is described in NL Patent 2 017 403 B1, Zeeland Refinery N.V. (NL), published on Sep. 21, 2018.

b. Or a Pulsed Laser Input Beam (ILB) is divided by a Diffractive Beam Splitter (LBS) into a group of parallel-divided Pulsed Laser Output Beams (OLBk) focused on a matrix of n Pulse Points (SPk) of an ultrasonic Laser Pulses Array (LEA). An array of EMAT receivers is optionally organized into an EMAT Receivers Array (ERA). However, in this configuration, the power of each outgoing Pulsed Laser Output Beams (OLBk) is divided by more than n.

c. Or a Pulsed Laser Input Beam (ILB) is continuously moved by a Continuous Beam Scanner (LSS) into a continuous slice of mobile and continuously focused Pulsed Laser Output Beams (OLBk) along a continuous line of focus passing through n distant Pulse Points of an ultrasonic Laser Pulses Array (LEA). An array of EMAT receivers is optionally organized into an EMAT Receiver Array (ERA). However, in this configuration, the power of each focused Pulsed Laser Output Beam (OLBk) directed towards continuously moved Pulse Points is significantly reduced.

d. Or a Pulsed Laser Input Beam (ILB) is discontinuously and sequentially diffracted by an Agile Matrix Multi Beams Laser Transmitter (ABLAT), generating successive angularly distant Pulsed Laser Output Beams (OLBk) directed towards n distant Pulse Points of an ultrasonic Laser Pulses Array (LEA). However, in this configuration, according to the prior art, only a single UWR receiver is used and positioned on the surface of the object. This prior art configuration combines a Laser Pulses Array (LEA) with n (n×1) cells with an EMAT Receivers Array (ERA) with a single cell. The two arrays have different cell configurations. This prior art configuration is inefficient for high-resolution B-scans or C-scans of large metallurgical objects. An example of a specific implementation of this UNDT technology is described in Dixon et al., "Detection of cracks in metal sheets using pulsed laser generated ultrasound and EMAT detection," published in Ultrasonics, IPC Science and Technology Press Ltd, Guildford, GB, vol. 51, no. 1, Jan. 1, 2011, pages 7-11.

Technical Problem

From the analysis of the prior art, it is evident that due to the aforementioned limitations, hybrid Laser-EMAT UNDT devices suffer from the following drawbacks, specifically for A-scanning and B-scanning of metallurgical objects, which the invention aims to solve:

a. Each vertical view of internal discontinuities located in the depth of the object along a Detection Line is primarily inspected from a single A-scan perspective corresponding to an EMAT receiver. This leads to poor resolution in characterizing internal discontinuities.

b. The ultrasonic signal is affected by the problem of nearby and distant reflectors of discontinuities. Wave reflectors formed by internal discontinuities are angularly masked by larger or closer intermediate reflectors of discontinuities or by other internal reflectors of discontinuities. This results in poor resolution and unreliability in B-scanning.

c. The problem of processing the complex components of A-scan signals and reducing noise remains unresolved.

d. The required number and/or power of laser sources and the complexity of the configuration needed to achieve a certain pulse point power at locations close to the receiving EMATs, and thus attain a certain resolution of the UNDT device, lead to excessive costs for industrial applications, particularly in the metallurgical industry.

e. Effective noise elimination in the signal from each EMAT receiver remains unresolved.

f. The signal-to-noise ratio provided by each EMAT receiver is low.

g. The resolution and sensitivity of hybrid Laser-EMAT UNDT devices are low.

Consequently, the prior art does not propose any industrial configuration of a 3D Steel Slab Scanner designed for continuous C-scan 3D scanning of large-section steel slabs, and for the objective detection and characterization of their surface and subsurface discontinuities during continuous casting in steel mills at temperatures exceeding 1000° C.

SUMMARY OF THE INVENTION

In summary, an object of this invention is to provide a new agile UNDT device comprising dual EMATs/Laser-pulse matrix array, for performing ultrasonic scanning of a electrically conductive metallic object, along a scanning line towards a surface control area, where surface and/or subsurface discontinuities in the material are to be characterized.

The invention has, among its main novel features, an agile UNDT device with a dual EMATs/Laser-Pulse Matrix, taken in combination with an investigated conductive metallic Object, comprising:

a. A conductive metallic Object, having a Control Area of its Surface arranged along a Scanning Line;
b. A Pulsed Laser Input Source producing a pulsed Laser Input Beam;
c. A Matrix Multi Beams Laser Transmitter of the type Agile Matrix Multi Beams Laser Transmitter, powered by the Pulsed Laser Input Source, of the type comprising Beams Movement Means and configured i) to periodically and discontinuously diffract the Pulsed Laser Input Beam into a multitude of successive Pulsed Laser Output Beams according to a certain Scanning Cycle Period, and ii) to focus the Pulsed Laser Output Beams into a multitude of Pulse Points belonging to the Surface and located inside and at the center of distinct Pulse Cells, each populated at its center with a Pulse Point, spatially arranged periodically, forming a Laser Pulses Array, positioned on the Control Area of the Surface;
d. a Receivers Assembly consisting of a multitude of electromagnetic acoustic transducers of the type EMAT Receivers, configured to receive Ultrasonic Waves, geometrically arranged such that i) the EMAT Receivers are geometrically distributed in a multitude of Sensors Groups, each consisting of one or more EMAT Receivers; and, ii) a plurality of at least three of these Sensors Groups are each positioned inside one of the n Detection Cells, spatially arranged periodically, of an EMAT Receivers Array, of matrix size (n) with n cells, positioned on the Control Area of the Surface along a Detection Line parallel to the Scanning Line;

The invention presents, among other novel features, the following combined characteristics, that the Agile Matrix Multi Beams Laser Transmitter and the Receivers Assembly are configured such that:

a. the EMAT Receivers Array is parallel to the Laser Pulses Array;
b. the Laser Pulses Array is composed of n Pulse Cells, and the EMAT Receivers Array is also composed of n Detection Cells, such that both are comprised of the same common number (n) of cells;
c. the Sensors Spatial Periodicity of the distances between the centers of two adjacent Detection Cells of the EMAT Receivers Array is similar to the Pulses Spatial Periodicity of the distances between the centers of two adjacent Pulse Cells of the Laser Pulses Array;
d. each Pulse Cell is geometrically associated with a neighbouring Detection Cell, and each Detection Cell is either i) adjacent to, overlaps with, or ii) covers at list partially its associated Pulse Cell.

BRIEF DESCRIPTION OF THE DRAWINGS

These characteristics, aspects, and advantages of the present invention, as well as others, will be better understood when the following detailed description is read in reference to the attached drawings, in which identical characters represent identical parts throughout the drawings, wherein.

DESCRIPTION OF EMBODIMENTS

Figure 1:
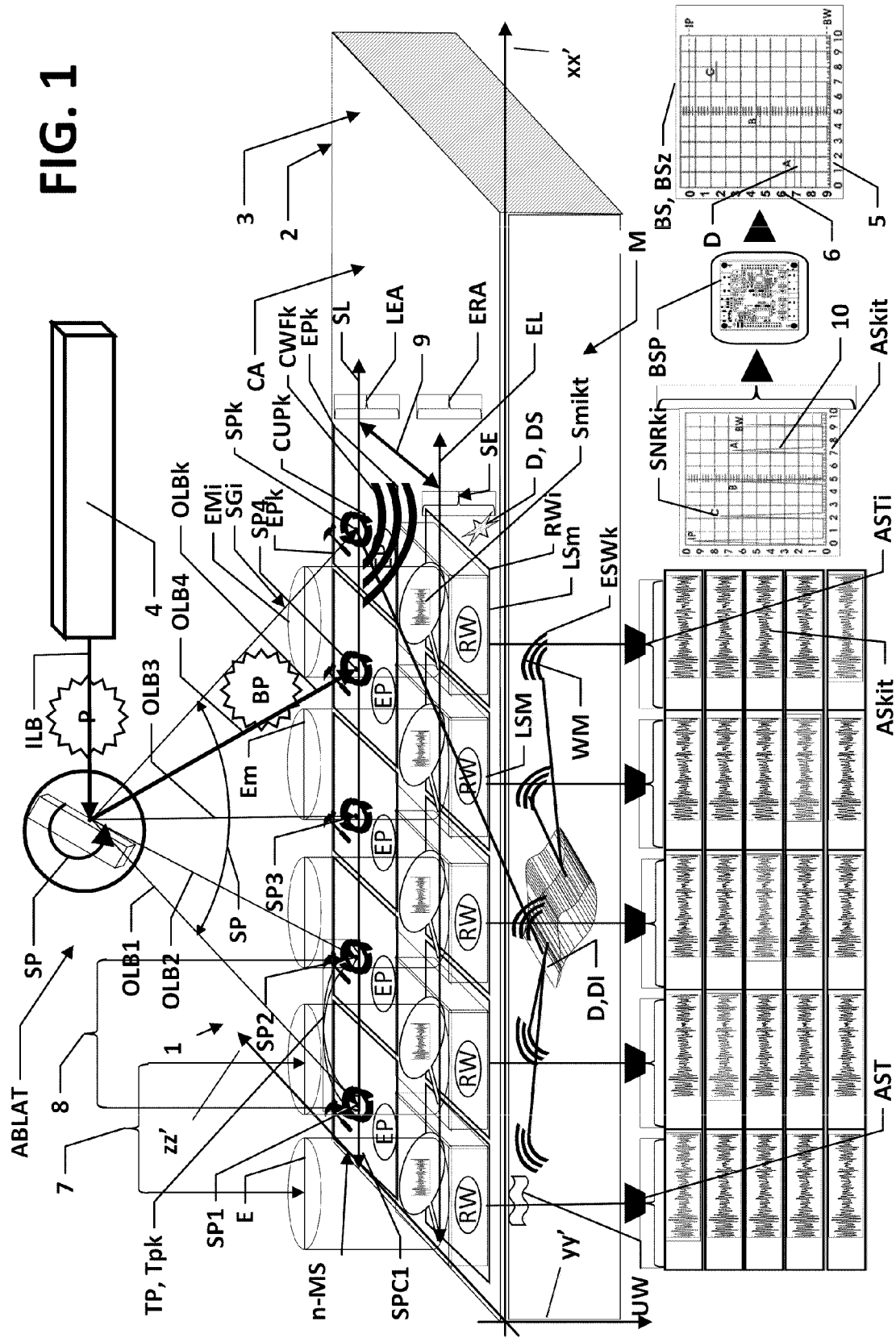
FIG. 1 is a schematic illustration of an Agile Dual EMATs/Laser-Pulse Matrix UNDT Device according to the invention, shown in perspective.

FIG. 1 is a schematic illustration of a dual matrix EMATs/Laser-Pulse UNDT Device (1) according to the invention.

This UNDT Device (1) is particularly suitable for performing ultrasonic Scanning (5, Sz) of a conductive metallurgical Object (2) along a Scanning Line (xx') towards a Control Area (CA) on its Surface (3); where Surface Discontinuities (DS) and/or Subsurface Discontinuities (DI) in its Material (M) need to be characterized.

The UNDT Device (1) combines:
a. a Pulsed Laser Input Source (4), producing a Pulsed Laser Input Beam (ILB) with a certain Laser Power (P), optically generated in Pulses (Ppk), and having a certain Pulse Duration (PT);
b. An Agile Matrix Laser Transmitter (ABLAT), powered by the Pulsed Laser Input Source (4), and configured to periodically diffract by leaping the Pulsed Laser Input Beam (ILB) into a multitude of successive Pulsed Laser Output Beams (OLBk) (1≤k≤n) successively distant, according to a certain Scanning Cycle Period (SP) in time;
c. A Receivers Assembly (SE) consisting of a multitude of m (m>=n) electromagnetic acoustic transducers of the type EMAT Receivers (E, Em, Emi), configured to receive Ultrasonic Waves (UW);
d. A Laser Pulses Array (LEA);
e. And a EMAT Receivers Array (ERA).

Referring to FIG. 1, and to the Agile Matrix Transmitter (ABLAT), it can be seen that during each Scanning Cycle Period (SP), each Pulsed Laser Output Beam (OLBk) is periodically activated for a certain Pulse Period (TP, TPk) (TP=SCP/n). During this period, it generates a specific train of (p) (with p≥1) Laser Pulses (Ppk) each specifically focused on a Pulse Point (SPk) of a Grid (n-MS) positioned on the Control Area (CA). Furthermore, the n Pulse Points (SPk) of the Grid (n-MS) are dispersed and spatially separated from each other by a Pulse Offset Distance (OD) of at least 10 mm. Each Pulsed Laser Output Beam (OLBk) is successively fed with a Beam Power (BP, BPk) that is nearly equal to the full Laser Power (P) (BP≈P).

The Laser Pulses Array (LEA) is positioned on the Control Area (CA) along a Pulse Line (SL), parallel to the Scanning Line (xx'). It is divided into n Pulse Cells (EP, EPk) (1≤k≤n), spatially organized in a periodic manner. The Pulse Cells (EP, EPk) are each populated with a Pulse Point (SPk); where during each Pulse Period (TP, TPk), a Laser Pulse (Ppk) from a Pulsed Laser Output Beams (OLBk) is periodically diffracted by leaping, by the Agile Matrix Laser Transmitter (ABLAT). Each Pulse Cell (EP, EPk) functions as an ultrasonic pulse emitter.

The EMAT Receivers Array (ERA) is also positioned on the Control Area (CA), along a Detection Line (EL) parallel to the Scanning Line (xx'). It is divided into n Detection Cells (RW, RWi) (1≤i≤n), spatially organized in a periodic manner. Each Detection Cell (RW, RWi) is populated with a Sensors Group (SGi), consisting of one or more EMAT Receivers (E, Emi). Each Detection Cell (RW, RWi) functions as an ultrasonic wave receiver.

The Agile Matrix Laser Transmitter (ABLAT) is configured in such a way that during the Pulse Periods (TP, TPk) (TP=SCP/n) of each Scanning Cycle Period (SP), each Pulsed Laser Output Beam (OLBk) impinges periodically and successively one of each Pulse Cell (EPk) by Laser Pulses (Ppk). This locally induces a Centred Ultrasonic Pulse (CUPk), which generates a Centred Primary Wavefront (CWFk) in the Material (M), with its center positioned successively and periodically by leap on each Pulse Point (SPk), and which cyclically moves by leaps along the Laser Pulses Array (LEA).

Each successive Centred Primary Wavefront (CWFk) interacts and creates reflection echoes on Discontinuities (D). This generates, during each Pulse Period (TPk), a set of Interacted Secondary Waves (ESWk, ESWki) of different Wave Modes (WM) within the body of the Object (2) and on the Control Area (CA), whose overall topology changes during each Pulse Period (TPk).

The Receivers Assembly (SE) of EMAT Receivers (E, Em, Emi) is configured in such a way that the Lower Sensor Surface (LSm) of each EMAT Receiver (Em, Emi) is closely facing the Material (M). The EMAT Receivers (Emi) are organized into n Sensor Groups (SGi) (1≤i≤n), each consisting of an individual EMAT or a group of EMAT Receivers (Em); as described in more detail with reference to FIG. 7. The n Sensor Groups (SGi) of the EMAT are all arranged within a Detection Cell (RWi) of the EMAT Receivers Array (ERA). During each Pulse Period (TP, TPk) of a Scanning Cycle Period (SP), each EMAT Receiver (Emi) within a Detection Cell (RWi) is induced by the underlying ultrasound of the Interacted Secondary Waves (ESWk, ESWki). It generates, during ultrasonic activation in each Pulse Cell (EPk), a temporal electrical Cell Receiver Signal (Smikt).

Figure 2:
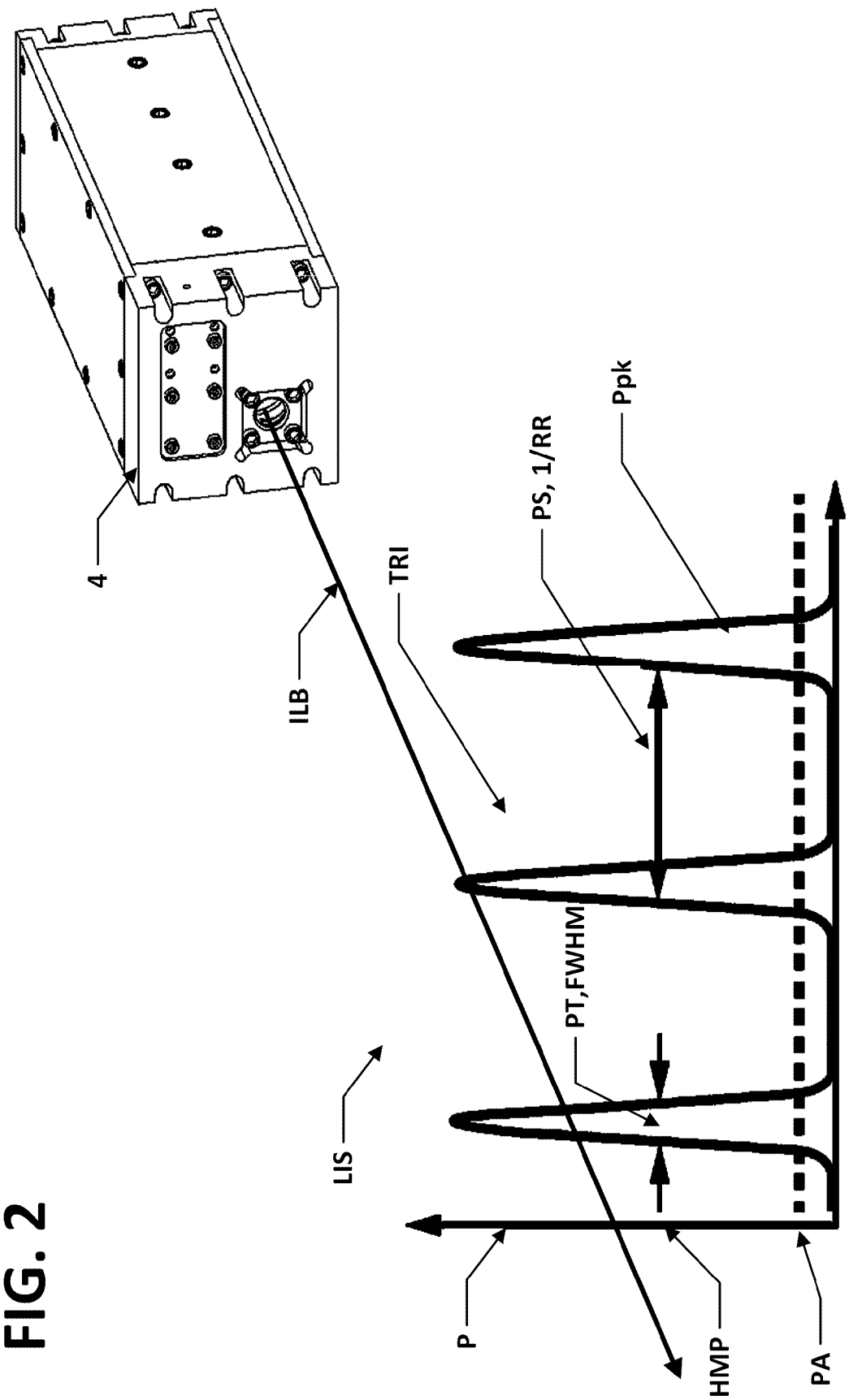
FIG. 2 is a schematic perspective illustration of the Pulsed Laser Input Source of an Agile UNDT Device according to the invention, and its Laser Signature.

Referring to FIG. 2, a preferred embodiment of the Pulsed Laser Input Source (4) of the UNDT Device (1) of the invention is shown, of the DPSS type (diode-pumped solid-state laser).

The operational characteristics of this preferred Pulsed Laser Input Source (4) are as follows:
a. Energy: 50-500 mJ;
b. Frequency: 10-300 Hz;
c. Pulse Power (PU): 1-50 MW;
d. Average Laser Power (PA): 0.5-150 W;
e. Pulse Duration (PT): 10-30 ns;
f. Wavelength: 1030-1064 nm;
g. Beam Diameter: 3-10 mm;
h. Size of Pulse Points (SPk), when the laser is combined with a recommended ABLAT according to the invention: 0.1-0.5 mm×5-30 mm.

The Laser Signature (LIS) of the Pulsed Laser Input Beam (ILB) appears in the left graph, where we can observe:
a. The Instantaneous Laser Power (P-W) as a function of Time (s);
b. The Pulse Duration (PT), or pulse width, generally defined as the Full Width (FWHM) at Half Maximum Power (HMP) of the optical power of the Laser with respect to Time (s);
c. The Repetition Rate (RR), or pulse repetition frequency of the pulses in the Input Train Of Pulses (TRI) of the Pulses (Ppk), which represents the number of emitted Pulses (Ppk) per second. The inverse of the Repetition Rate (RR) is the Temporal Pulse Spacing (PS) between two Pulses (Ppk) (=1/RR); and,
d. The Average Laser Power (PA).

Figure 3:
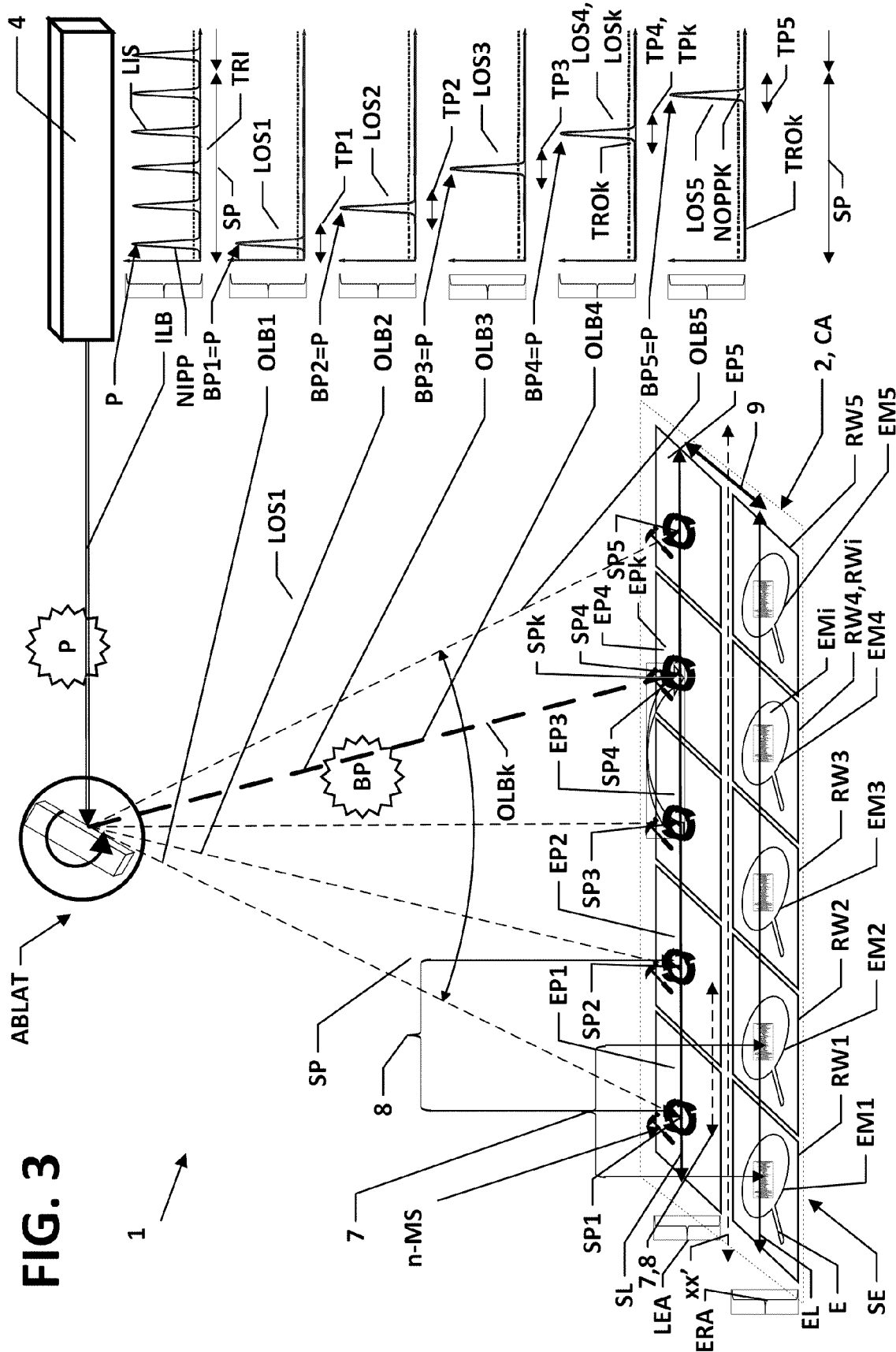
FIG. 3 is a schematic illustration of the UNDT Device of the invention, showing the Laser Signatures of its successively Pulsed Laser Output Beams emitted by leaping.

Referring to FIG. 3, according to an aspect of the invention, it can be seen that the Laser Pulses Array (LEA) consists of a matrix (5×1), formed by five Pulse Cells (EP, EPk, EP1, EP2, EP3, Ep4, EP5), organized in a row. Each Pulse Cell (EP) is populated at its center by a Pulse Point (SPk, SP1, SP2, SP3, SP4, SP5). They are all aligned along the Pulse Line (SL). Similarly, the EMAT Receivers Array (ERA) consists of a matrix (5×1), formed by five Detection Cells (RW, RWi, RW1, RW2, RW3, RW4, RW5), organized in a row. Each Detection Cell (RW) is populated at its center by an EMAT Receiver (E, Emi, EM1, EM2, EM3, EM4, EM5). They are all aligned along the Sensors Line (EL) parallel to the Pulses Line (SL). The Agile Matrix Laser Transmitter (ABLAT) is powered by the Pulsed Laser Input Source (4). It diffracts, periodically and successively by leaps, the Pulsed Laser Input Beam (ILB) into five Pulsed Laser Output Beams (OLBk, OLB1, OLB2, OLB3, OLB4, OLB5) (1≤k≤5). Successively, a Pulsed Laser Output Beam (OLBk) impacts a different and separate Pulse Point (SPk) during each Scanning Cycle Period (SP).

The Laser Signature (LIS) of the Pulsed Laser Input Beam (ILB), as well as the Laser Signatures (LOSk, LOS1, LOS2, LOS3, LOS4, LOS5) of the Pulsed Laser Output Beams (OLBk, OLB1, OLB2, OLB3, OLB4, OLB5) appear in the right graphs. During each Scanning Cycle Period (SP), the Number of Incoming Pulses Per Period (NIPP) of the Input Train Of Pulses (TRI) of the Pulses (Ppk) of the Pulsed Laser Input Beam (ILB) is a multiple of the Number of Outgoing Pulses Per Period (NOPPk) of the Output Train Of Pulses (TROk) of each Pulsed Laser Output Beam (OLBk) diffracted during each Pulse Period (TP, TPk) (NIPP=n× NOPPk). For example, in the embodiment shown in FIG. 3, during each Scanning Cycle Period (SP), the Number of Incoming Pulses Per Period (NIPP) is five, while each Number of Outgoing Pulses Per Period (NOPPk) is one. Additionally, each Pulsed Laser Output Beam (OLBk) is powered by a Beam Power (BPk, BP1, BP2, BP3, BP4, BP5), successively focused on each Pulse Point (SPk, SP1, SP2, SP3, SP4, SP5) during each Pulse Period (TPk), with an energy almost equal to the energy of the Laser Power (P) (BPk=P). Therefore, almost all the energy of the Pulsed Laser Input Beam (ILB) is focused on a Pulse Point (SPk) during a Pulse Period (TPk).

In a preferred embodiment of the invention, the UNDT Device (1) is equipped with EMAT Receivers (E, Em, Emi) as described in the French patent application filed under No. FR2009138 on Sep. 9, 2020, entitled "EMAT System for the detection of surface and internal discontinuities in conductive structures at high temperature". Such EMAT Receivers are configured with a laminated magnetic core consisting of a recessed matrix formed by a sandwich of multiple successively metallic and insulating thin laminated sheets. A grooved cylindrical opening goes through each thin sheet of the magnetic core from one side to the other.

Figure 4:
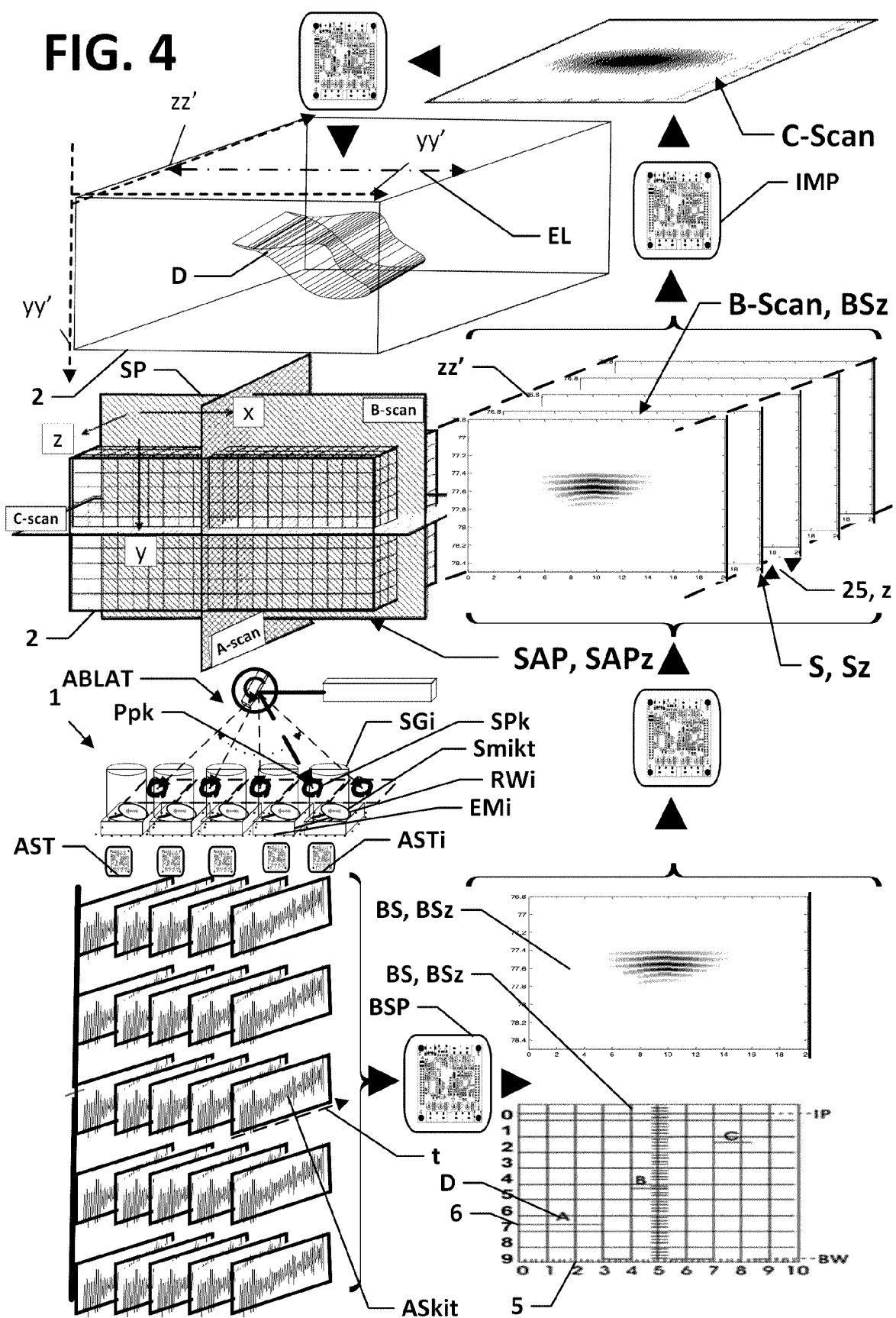
FIG. 4 is a schematic perspective illustration of the functionalities and operating steps of a UNDT Device according to the invention.

Referring to FIG. 4, and in combination with FIG. 1, according to an aspect, the UNDT Device (1) is equipped with a set of A Scan Transmitter (AST, ASTi). Each A Scan Transmitter (AST, ASTi) is connected to the EMAT Receivers (Emi) of a Sensor Group (SGi) belonging to a Detection Cell (RWi). They are configured to process and combine, during each Pulse Period (TPk), the information from each Cell Receiver Signal (Smikt) of the Sensor Groups (SGi). They generate a set of at least n2 A Scan Sensor Cell Signals (ASkit), consisting of digital wavelets, correlated to the local variations of the ultrasonic Interacted Secondary Waves (ESWki) observed by each Sensor Group (SGi) of a Detection Cell (RWi), when activated by the Pulses (Ppk) of a Pulse Point (SPk), as a function of the Elapsed Time (t) of ultrasonic signal reception during each Pulse Period (TPk).

The UNDT Device (1) is also equipped with a B-Scan Processor (BSP), connected to the A-Scan Transmitters (ASTi). It is configured to process and combine the information from the n2 A-Scan Sensor Cell Signals (ASkit) of each Detection Cell (RWi) activated by a Pulse Point (SPk) during a Scanning-Cycle-Period (SP). The B-Scan Processor (BSP) generates a B-Scan Presentation (B-Scan, BS, BSz) in the Scanning Plane (SAP, SAPz) perpendicular to the Control Area (CA) of the Object (2) along the Detection Line (EL), representing the Numerical Positions (5) with respect to the Depth (6) of the Discontinuities (D) in the Scanning Plan (SAP, SAPz).

Referring again to FIG. 3, in one aspect of the invention, the UNDT Device (1) has the following characteristics. The EMAT Receivers Array (ERA) is adjacent and parallel to the Laser Pulses Array (LEA). In the direction of the Scanning-Line (xx'), the Sensors Spatial Periodicity (7), representing the distances between the centers of two adjacent Detection Cells (RW, RWi) in the EMAT Receivers Array (ERA), is similar to the Pulses Spatial Periodicity (8), representing the distances between the centers of two adjacent Pulse Cells (EPk) in the Laser Pulses Array (LEA). Each Detection Cell (RWi) is geometrically associated with a neighbouring Pulse Cell (EPk) (when k=i). The EMAT Receivers (Emi) of each Sensor Group (SGi) in a Detection Cell (RWi) are slightly offset from the Pulse-Point (SPk) of the associated neighbouring Pulse Cell (EPk) (k=i) by a minimal Offset Distance (9). This ensures that none of the Pulsed Laser Output Beams (OLBk) focuses on the structure of any EMAT Receiver (Emi).

In a preferred embodiment of the invention, the number n of EMAT Receivers (Em, Emi) is equal to the number n of Pulse-Points (Spk). And each Detection-Cell (RWi) is populated by a single EMAT Receiver (Em, Emi).

Figure 5:
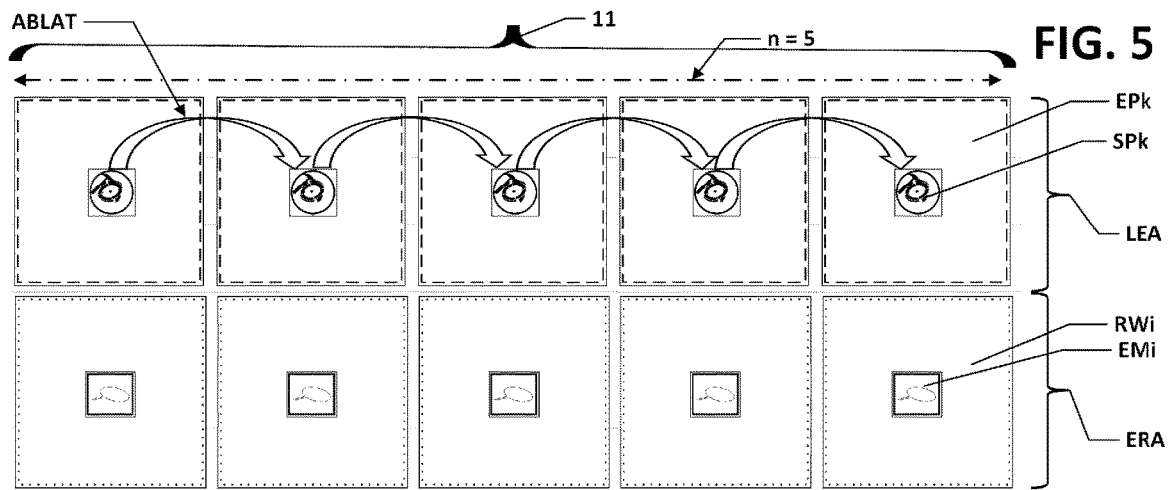
FIG. 5, FIG. 6, FIG. 7, and FIG. 8 are successive top schematic views of a first, second, third, and fourth preferred configuration of the EMAT Receivers Array and the Laser Pulses Array of the UNDT Device of the invention.

Referring to FIG. 5, in a first preferred configuration, the Laser Pulses Array (LEA) and the EMAT Receivers Array (ERA) are both a single-line matrix (n×1). The Laser Pulse Matrix (LEA) is parallel and contiguous to the EMAT Receivers Array (ERA). The Laser Pulses Array (LEA) and the EMAT Receivers Array (ERA) taken together are organized into a 2-row matrix (n×2). Each Detection Cell (RWi) is adjacent to a Pulse Cell (EPk) in the column direction of the Matrix (11).

Figure 6:
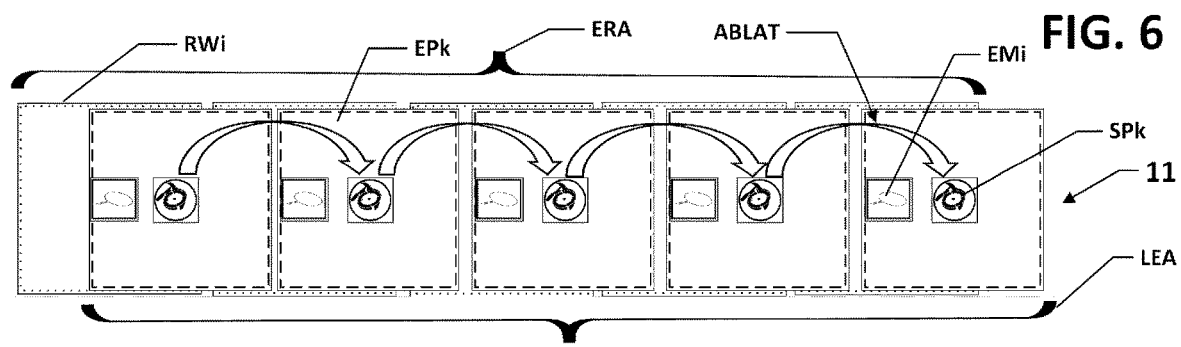

Referring to FIG. 6, in a second preferred configuration, the Laser Pulses Array (LEA) is parallel and at least partially overlaps the EMAT Receivers Array (ERA). And each Detection Cell (RWi) is adjacent to and/or partially overlaps a Pulse Cell (EPk) in the row direction of the Matrix (11).

Figure 7:
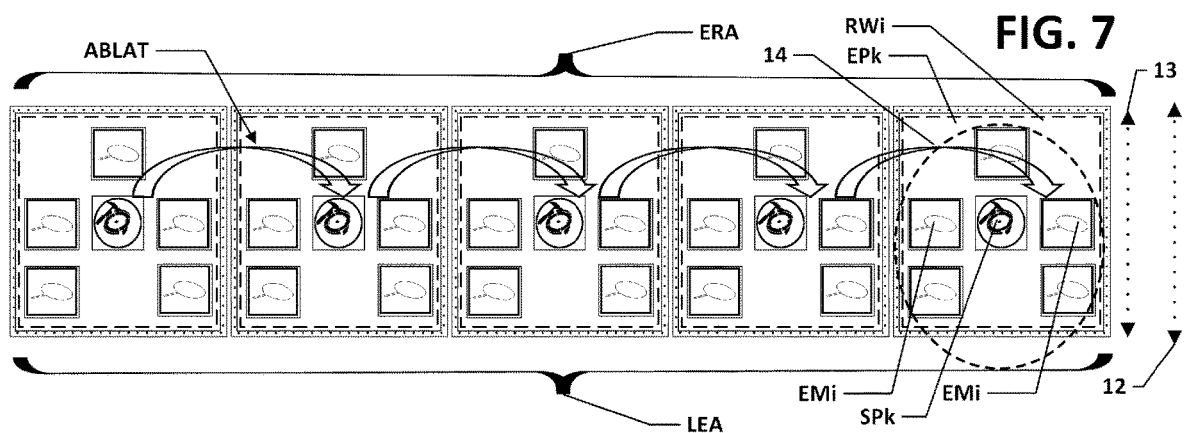

Referring to FIG. 7, in a third preferred configuration, the Laser Pulses Array (LEA) is parallel and partially or completely covers the EMAT Receivers Array (ERA). The Height (12) of the EMAT Receivers Array (ERA) is equal to or greater than the Height (13) of the Laser Pulses Array (LEA) in the column direction. And each Pulse Point (SPk) of a Pulse Cell (EPk) is adjacent to at least two EMAT Receivers (Em) (k=i) in its associated Detection Cell (RWi). They are arranged in a Sensors Figure (14) surrounding the Pulse Point (SPk) of the Pulse Cell (EPk).

Figure 8:
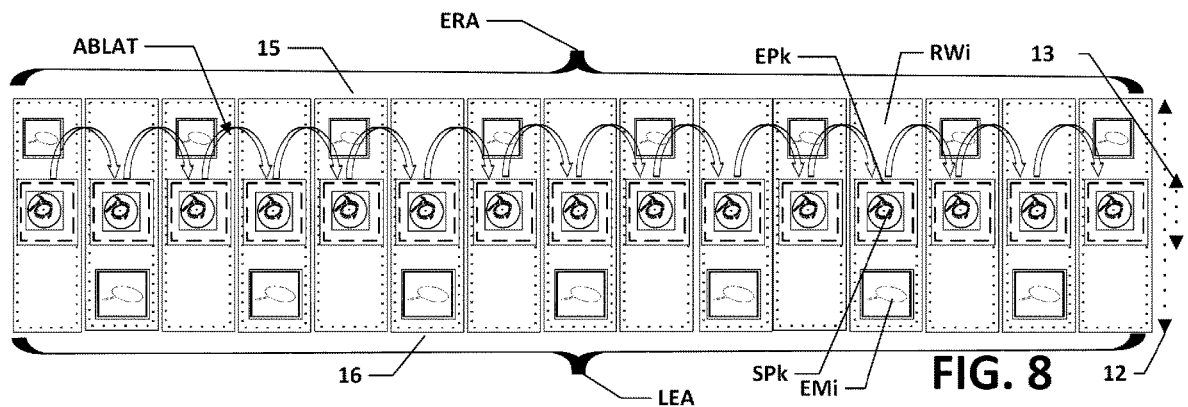

Referring to FIG. 8, in a fourth preferred configuration, the Laser Pulses Array (LEA) is parallel to and overlaps the EMAT Receiver Matrix (ERA). The Height (12) of the EMAT Receivers Array (ERA) is greater than the Height (13) of the Laser Pulses Array (LEA) in the column direction. And each Pulse Point (SPk) of a Pulse Cell (EPk) is neighbouring to at least one EMAT Receiver (Emi) in its associated Detection Cell (RWi) (k=i), which is successively and alternately located Above (15) and Below (16) each Pulse Cell (EPk) in the column direction.

Figure 9:
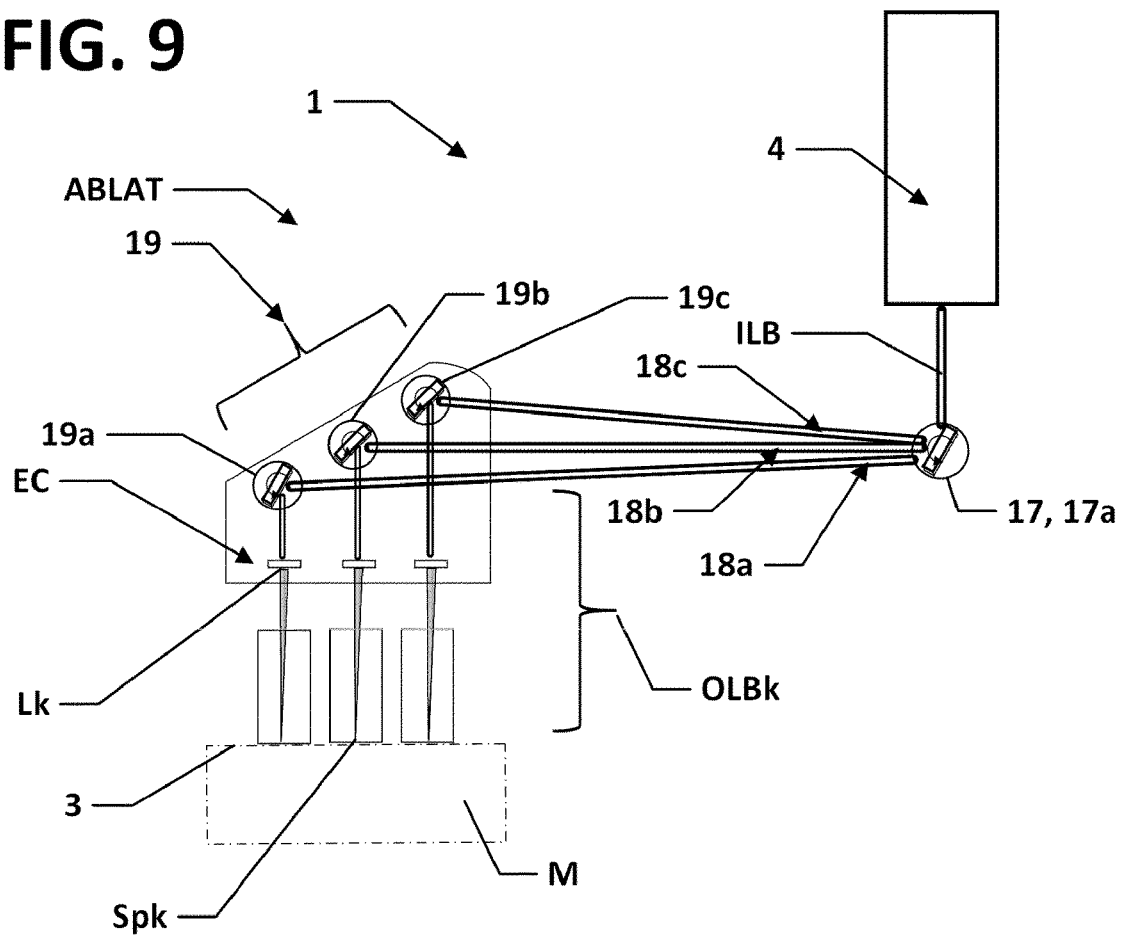
FIG. 9 is a schematic front view of a recommended configuration of an Agile Matrix Multi Beams Laser Transmitter (ABLAT) of the type optical-mechanical of the UNDT Device of the invention.
Figure 10:
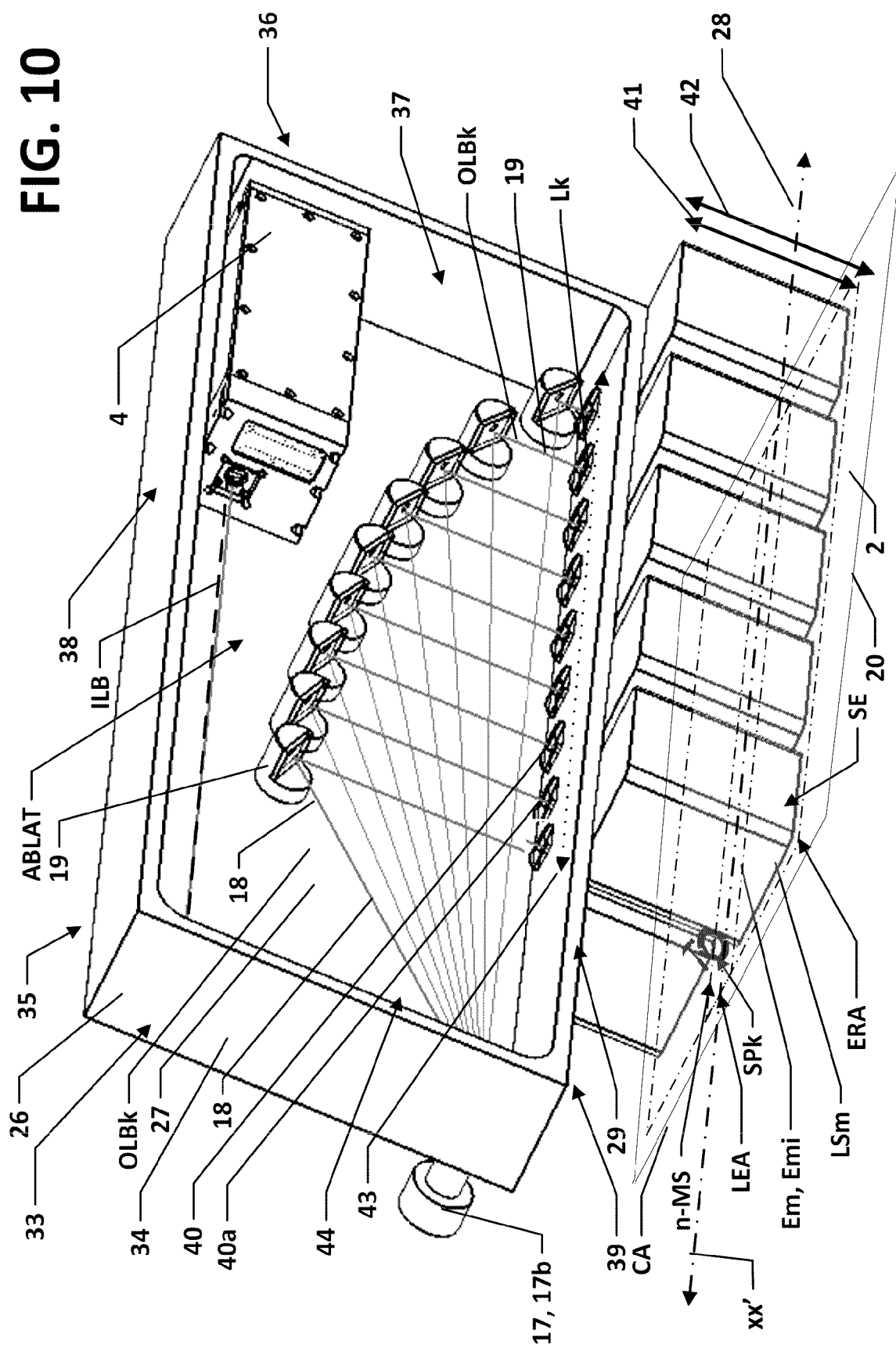
FIG. 10, FIG. 11, and FIG. 12 are successive schematic isometric perspective, front, and bottom views of a recommended configuration of the UNDT Device of the invention organized with a B-Scan Support Jaw and its Agile Matrix Multi Beams Laser Transmitter (ABLAT) of the type optical-mechanical.

Referring to FIG. 9 and FIG. 10, according to an aspect of the invention, the Agile Matrix Laser Transmitter (AB-LAT) is of an optical-mechanical type technology. It includes Beams Movement Means (17), for example, consisting of at least one motorized oscillating Primary Directional Diffraction Mirror (17a, 17b), which is angularly movable and struck by the Pulsed Laser Input Beam (ILB), to periodically diffract it into multiple Secondary Laser Beams (18, 18a, 18b, 18c). It also includes Mechanical Beam-Leaping Means (19), for example, comprised of a set of at least n Secondary Leaping Diffraction Mirrors (19, 19a,

19b, 19c), which are periodically struck by different Secondary Laser Beams (18) and diffract each of them into a Pulsed Laser Output Beam (OLBk), directed towards a specific Pulse Point (SPk). The Primary Directional Diffraction Mirror (17a) has a plurality of angular positions corresponding to the directions of the plurality of Secondary Leaping Diffraction Mirrors (19).

FIG. 9 provides a schematic front view of a first recommended configuration of Agile Matrix Laser Transmitter (ABLAT) of an Optical-Mechanical type of the UNDT Device (1) according to the invention. In this simplified schematic configuration, the Beams Movement Means (17) are composed of a single motorised fast-scanning oscillating Primary Directional Diffraction Mirror (17a). The Mechanical Beam-Leaping Means (19) consist of a set of three motorized Secondary Leaping Diffraction Mirrors (19a, 19b, 19c) (n=3), generating three Pulsed Laser Output Beams (OLBk) through leaping, focused towards three Pulse Points (SPk). The fast-scanning Primary Directional Diffraction Mirror (17a) has a plurality of angular positions. It is angularly movable to periodically oscillate its reflection angle successively towards the three Secondary Leaping Diffraction Mirrors (19, 19a, 19b, 19c). The Pulsed Laser Input Beam (ILB) is focused on the fast-scanning Primary Directional Diffraction Mirror (17a). Through reflection, during each Scanning Cycle Period (SP), it periodically and successively focuses three Secondary Laser Beams (18a, 18b, 18c) towards each of the three Secondary Leaping Diffraction Mirrors (19a, 19b, 19c), during a Pulse Period (TP, TPk).

The Secondary Leaping Diffraction Mirrors (19) are also angularly movable. The Secondary Leaping Diffraction Mirrors (19) are angularly moved at a relatively slower speed than the fast-scanning Primary Directional Diffraction Mirror (17). The Agile Matrix Laser Transmitter (ABLAT) is further equipped with an Ocular Configuration (EC). This configuration consists of a set of three Lenses (Lk). Each Lens is associated with a Secondary Leaping Diffraction Mirrors (19). Each of the three Secondary Leaping Diffraction Mirrors (19, 19a, 19b, 19c) is configured to direct, through diffraction and successive leaps, three Pulsed Laser Output Beams (OLBk) through one of the three associated Lenses (Lk). Each of the three Lenses (Lk) is positioned at a sufficient distance from the Surface (3) of the Object (1) to focus its Pulsed Laser Output Beam (OLBk) towards a specific Pulse Point (SPk) of the Laser Pulses Array (LEA), which is distant from the previous one. Such an Agile Matrix Laser Transmitter (ABLAT), equipped with a single Pulsed Laser Input Beam (ILB), generates a set of three Pulsed Laser Output Beams (OLBk) focused through leaping towards the three Pulse Points (SPk). It successively induces a strong Centred Ultrasonic Pulse (CUPk) generating a Centred Primary Wavefront (CWFK) near the Pulse Points (SPk) of a Laser Pulses Array (LEA) (3×1), adjacent to three EMATs (Emi) of an EMAT Receivers Array (ERA) (3×1). The energy of the Beam Power (BP) of each of the three Pulsed Laser Output Beams (OLBk) focused on each of the three Pulse Cells (EPk) is nearly equal to the complete Laser Power (P) of the Pulsed Laser Input Beam (ILB) during a Pulse Period (TP, TPk).

According to a second recommended configuration of the invention (not shown in the figures), the Agile Matrix Laser Transmitter (ABLAT) is of the non-mechanical deflection type, without using a mechanical beam guiding system. It includes, for example, an electro-optical phased array, or an adaptive micro-lenses array, or an array of collimating optical fibres, or an optical phasing array with liquid crystals.

Figure 11:
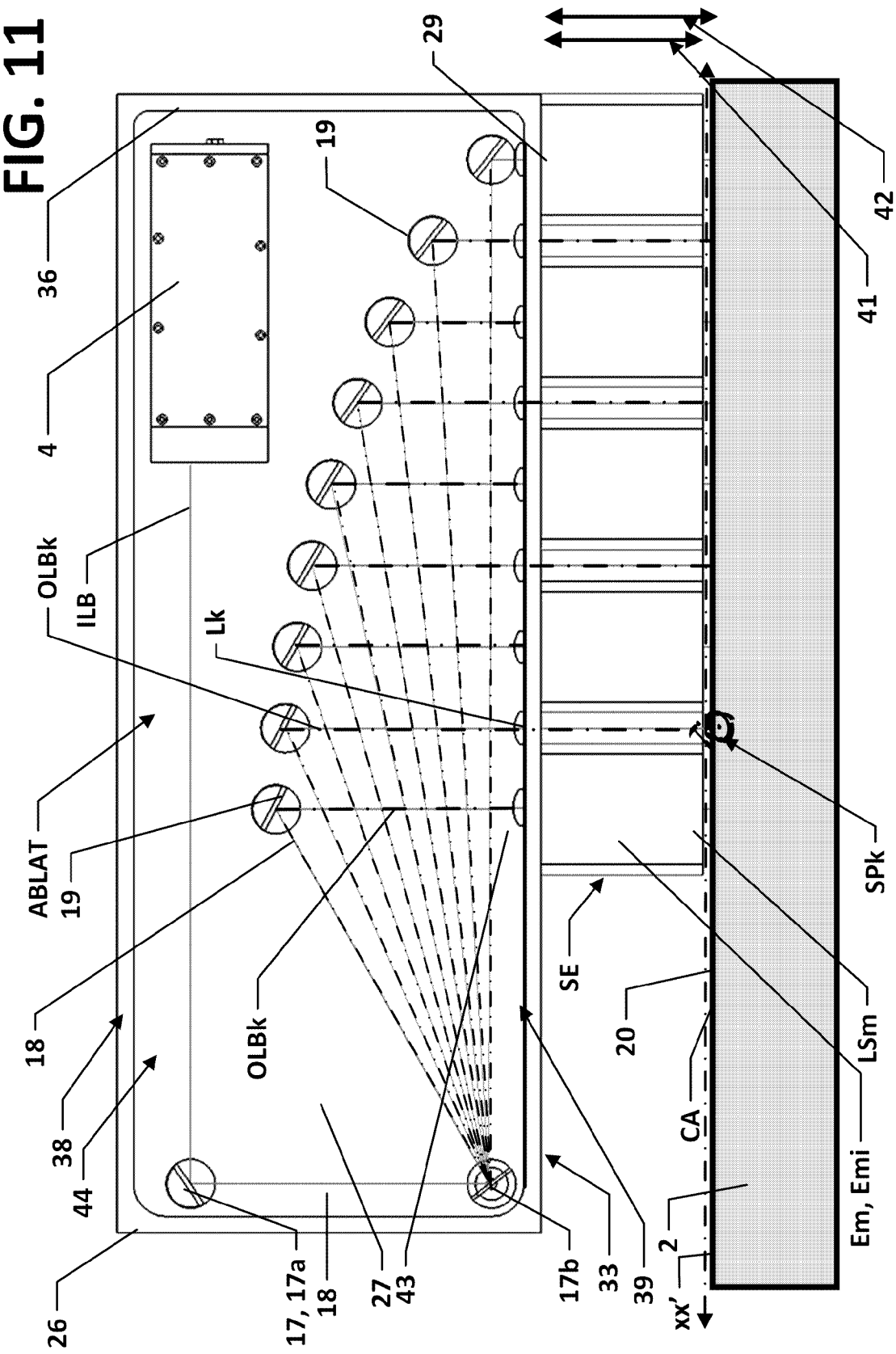
Figure 12:
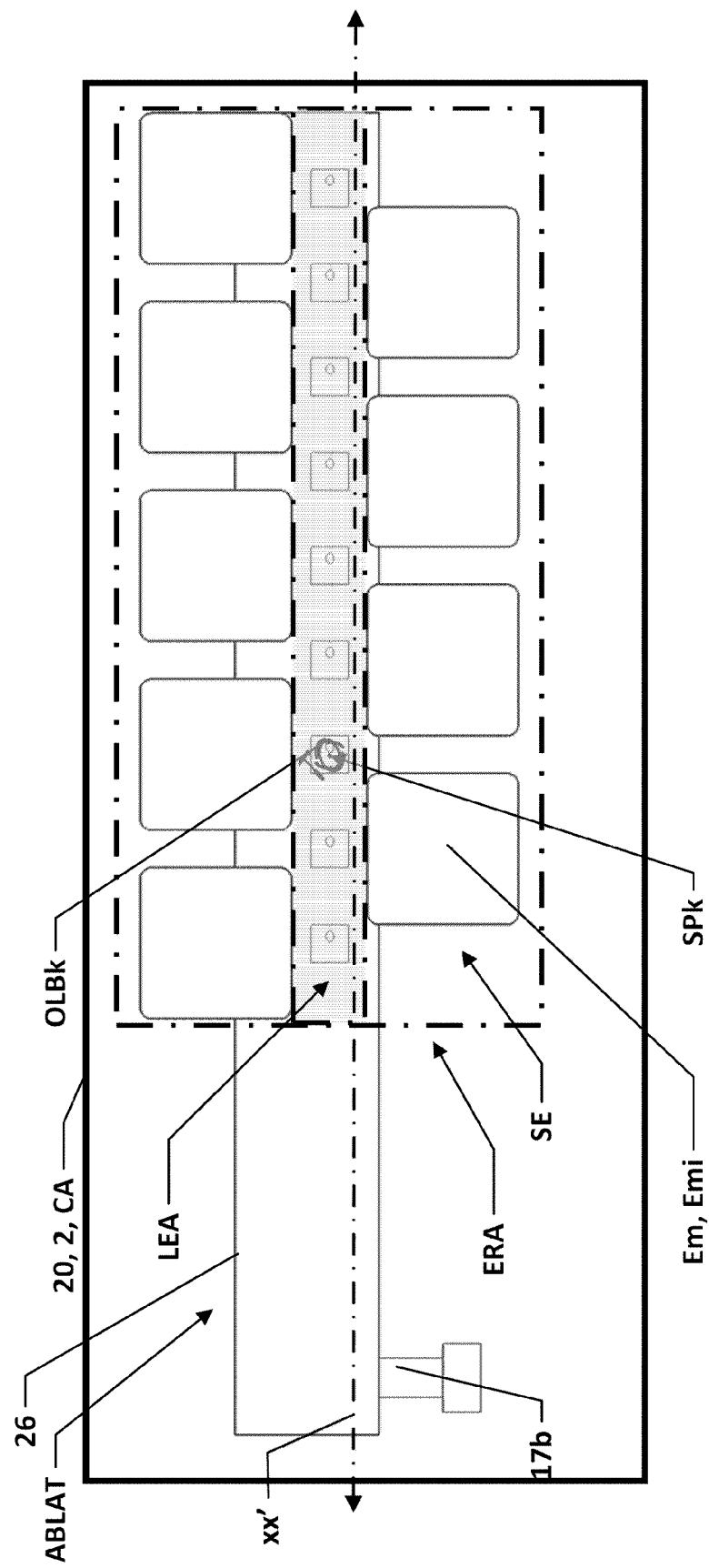

FIG. 10, FIG. 11, and FIG. 12 depict a recommended configuration of the UNDT Device (1) of the invention, implemented for B-scanning from one of its Longitudinal Plane Faces (20) of a Steel Slab (2), inspected at a high temperature of approximately 1200° C. in a continuous casting line of a steel mill. It is equipped with a B-Scan Support Jaw (26) for B-scanning from the top of the Steel Slab (2). The B-Scan Support Jaw (26) has a generally flat shape in a Jaw Plane (27). It extends along a Scanning Direction (28). It has at least one Straight Scanning Edge (29), oriented in the Scanning Direction (28) and parallel to a Scanning Line (xx') on at least one Longitudinal Plane Face (20) of the Object (2).

In this preferred configuration, a Pulsed Laser Input Source (4) is attached to the B-Scan Support Jaw (26). A Receivers Assembly (SE) consisting of nine EMAT Receivers (Em, Emi) is connected to the B-Scan Support Jaw (26). The EMAT Receivers (Em, Emi) are collectively arranged such that their Lower Sensor Surfaces (LSm) are positioned in the plane of an EMAT Receivers Array (ERA) positioned on a Control Area (CA) of a Longitudinal Plane Face (20) of the Object (2), close to the Straight Scanning Edge (29), and oriented along the Scanning Direction (28). The Agile Matrix Laser Transmitter (ABLAT) is attached to the B-Scan Support Jaw (26). It is arranged to periodically diffract a set of Pulsed Laser Output Beams (OLBk) towards a multitude of remote Pulse Points (SPk), organized in the Grid (n-MS), of a Laser Pulses Array (LEA) positioned on a Control Area (CA) of the Longitudinal Plane Face (20) of the Object (2), close to the Straight Scanning Edge (29), and oriented along the Scanning Direction (28).

Figure 13:
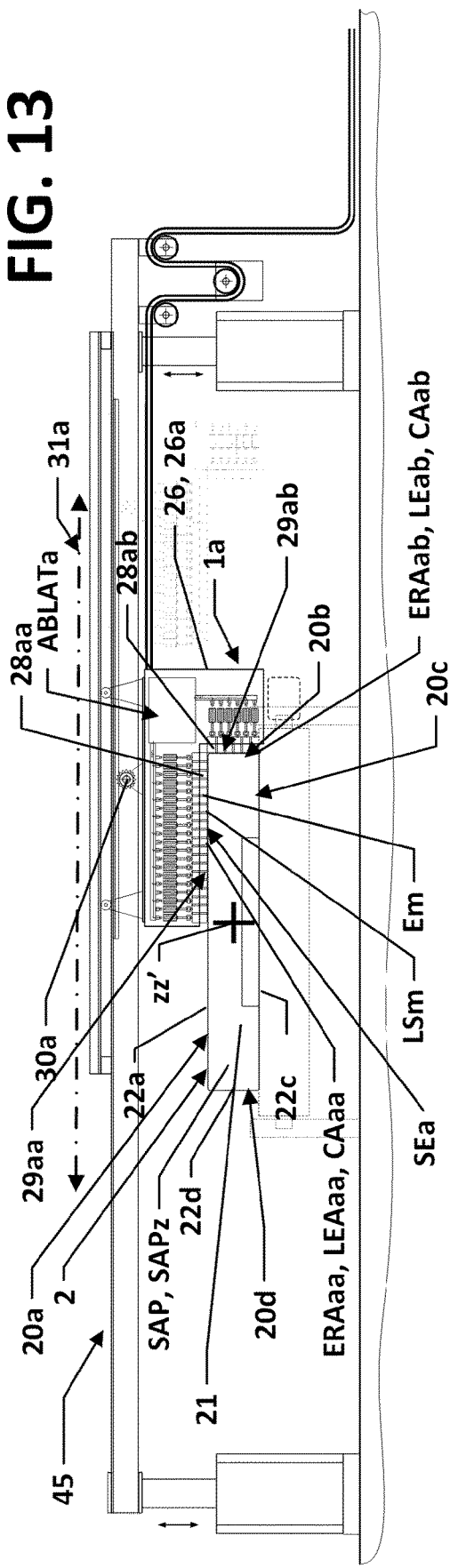
FIG. 13 is a schematic front view of a recommended configuration of a Steel Slab 3D Scanner of the invention, implemented for 3D scanning from the four faces of a high-temperature inspected steel plate in a continuous casting line of a steel mill, showing in particular its upper-right angular B-Scan Support Jaw for B-scanning from the upper and right faces of the steel plate.
Figure 14:
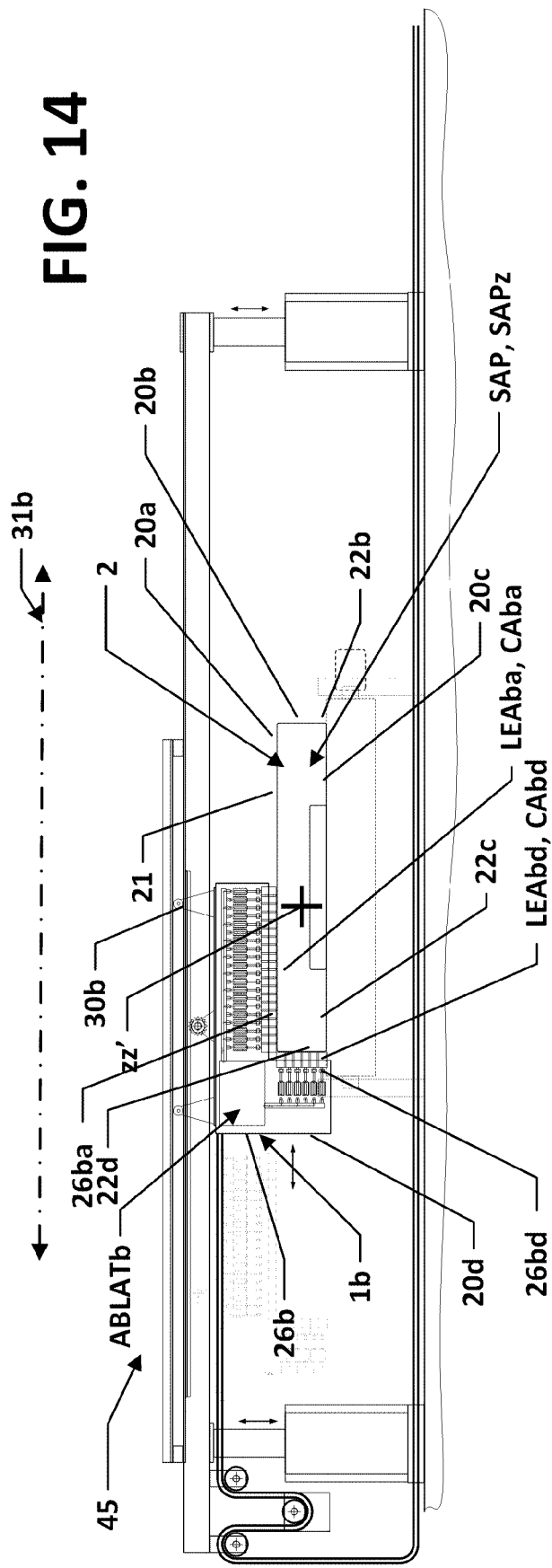
FIG. 14 is a schematic front view of a recommended configuration of the Steel Slab 3D Scanner of the invention, implemented for 3D scanning from the four faces of a steel plate, showing in particular its upper-left angular B-Scan Support Jaw for B-scanning the upper and left faces of the steel plate.
Figure 15:
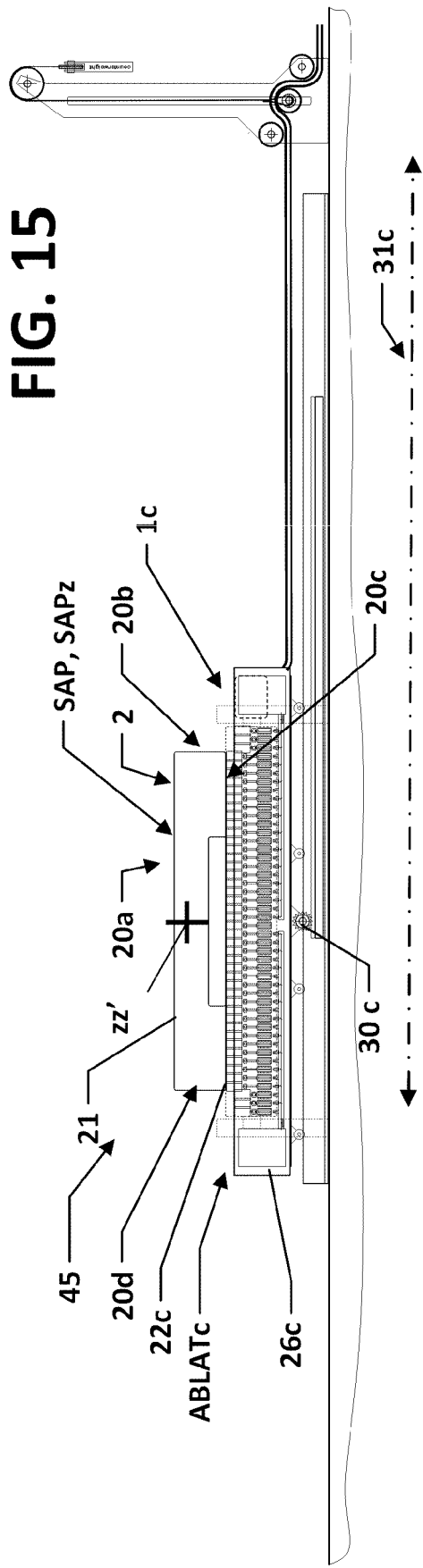
FIG. 15 is a schematic front view of a recommended configuration of the Steel Slab 3D Scanner of the invention, implemented for 3D scanning from the four faces of a steel plate, showing in particular its lower B-Scan Support Jaw for B-scanning from the lower face of the steel plate.
Figure 16:
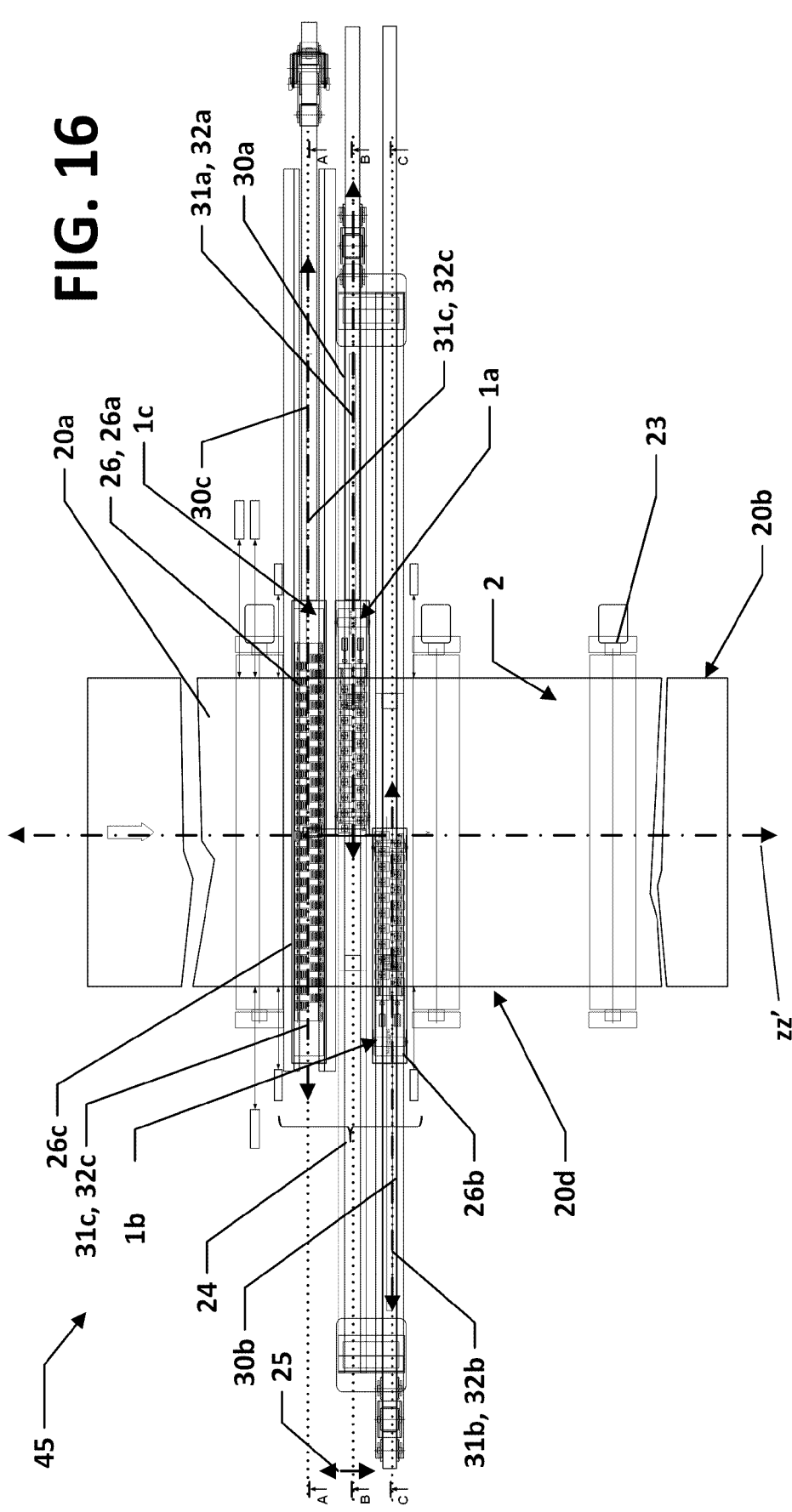
FIG. 16 is a schematic top view of a recommended configuration of the Steel Slab 3D Scanner of the invention, implemented for 3D scanning from the four faces of an inspected steel plate, showing in particular its three B-Scan Support Jaws for B-scanning the four faces of the steel plate.

FIG. 13, FIG. 14, and FIG. 15 each provide a partial front view of the components of a recommended configuration of the Steel Slab 3D Scanner (45) of the invention. It consists of a combination of three UNDT Devices (1a, 1b, 1c), implemented for 3D scanning of an inspected Steel Slab (2) from its four Longitudinal Plane Faces (20, 20a, 20b, 20c, 20d) at high temperature in a continuous casting line of a steel mill. The figures show successively, in particular, a schematic front view: i) in FIG. 13 of an upper-right B-Scan Support Jaw (26a) for B-scanning from the upper and right Longitudinal Plane Faces (20a, 20b) of the Steel Slab (2); ii) in FIG. 14 of an upper-left B-Scan Support Jaw (26b) for B-scanning from the upper and left Longitudinal Plane Faces (20a, 20b); and iii) in FIG. 15 of a lower B-Scan Support Jaw (26c) for B-scanning from the lower Longitudinal Plane Face (20c) of the Slab (2). FIG. 16 shows a schematic top view of the same Steel Slab 3D Scanner (45) and its 3 B-Scan Support Jaws (26a, 26b, 26c) for B-scanning from the four Longitudinal Plane Faces (20a, 20b, 20c, 20d) of the Steel Slab (2). This Steel Slab 3D Scanner (45) is equipped with three UNDT Devices (1a, 1b, 1c). It is particularly adapted for 3D scanning of any metallurgical Object (2), especially a Steel Slab (2), which is a cylindrical parallelepiped shape along the Object Axis (zz'). The Steel Slab (2) has four Longitudinal Plane Faces (20a, 20b, 20c, 20d) and a Polygonal Section (21) in the Scanning Plane (SAP, SAPz). The Polygonal Section (21) is surrounded by four Straight Segments (22a, 22b, 22c, 22d), each associated with one of the Longitudinal Plane Faces (20a, 20b, 20c, 20d). The Steel Slab (2) is processed in the continuous casting line of a steel mill at a temperature close to 1200° C. The Steel Slab 3D Scanner (45) includes Longitudinal Movement Means (23). They consist of a set of motorized horizontal cylindrical carrier rollers, perpendicular to the Object Axis (zz'). They are organized into a conveyor belt. Each carrier roller is powered by an electric motor to move the Steel Slab (2) along the Object Axis (zz'). It also includes Multiple B-Scanning Means (24) to perform successive periodic B-scans (5, Sz) in successive Scanning Planes (SAP, SAPz) of the Object (2), each separated by a Z-Step (25) along the Object Axis (zz'), as described with reference to FIG. 4.

Referring to FIG. 4, in one aspect, the UNDT Device (1, 1a, 1b, 1c) and the Steel Slab 3D Scanner (45) comprise an Image Processor (IMP) connected to the B-Scan Processor (BSP). It is configured to receive and process multiple digital B-Scan Presentations (B-Scan, BSz) of each Scanning Plane (SAP, SAPz) at successive periodic Z-Steps stages (25) along the Object Axis (zz'). It generates a digital 3D Representation (C-Scan) of the Steel Slab (2) with a digital location of its Discontinuities (D) and their characteristics.

As shown in FIG. 13, FIG. 14, FIG. 15, and FIG. 16, the Steel Slab (2) is moved relative to the B-Scan Support Jaw (26) toward the Object Axis (zz') made perpendicular to the Scanning Direction (28) thanks to the configuration of the Longitudinal Movement Means (23).

Referring to FIG. 10, FIG. 11, and FIG. 12, in one aspect, each B-Scan Support Jaw (26, 26, 26b, 26c) is configured as a Jaw Box (33) to meet safety conditions related to generated laser beams. The Jaw Box (33) is surrounded by walls, namely the Jaw Box Side Walls (34, 35, 36, 37), and the Jaw Box Top Wall (38). This delimits an almost closed Inner Box Volume (44). The Front Jaw Box Side Wall (37) is separable from the Jaw Box (33) and designed to be screwed onto it. It is not shown in the figure to allow seeing the Inner Box Volume (44). The different elements of the Agile Matrix Laser Transmitter (ABLAT) and the Pulsed Laser Input Source (4) are encapsulated inside the Inner Box Volume (44). The Jaw Box Bottom Wall (39) is pierced with a Multiple Recess (40), consisting of a multitude of Holes (40a) arranged longitudinally along the Straight Scanning Edge (29). In the described configuration, the Lenses (Lk) are positioned in each of the Holes (40a). Alternatively, and in a non-illustrated configuration, the Recess (40) can be simple, oblong, and consist of a single hole longitudinally made through the Jaw Box Bottom Wall (39). The Agile Matrix Laser Transmitter (ABLAT) directs the Pulsed Laser Output Beams (OLBk) through the Holes (40a) of the Recess (40) in a direction substantially parallel to the Jaw Plane (27) toward the Longitudinal Plane Face (20) of the Object (2). In this way, the Pulsed Laser Input Beam (ILB), the Pulsed Laser Output Beams (OLBk), and any occasional auxiliary laser beam produced inside the Jaw Box (33) and/or accidentally generated during the operation of the Agile Matrix Laser Transmitter (ABLAT) are blocked by the Jaw Box Side Walls (34, 35, 36, 37) and the Jaw Box Top Wall (38). However, those passing through the Recess (40) of the Jaw Box Bottom Wall (39), including the Pulsed Laser Output Beams (OLBk) passing through the Holes (40a), are intercepted by the Longitudinal Plane Face (20) of the Object (2).

Referring to FIG. 10, in one aspect of the invention, the EMAT Receivers (E, Emi) of the Receivers Assembly (SE) of the B-Scan Support Jaw (26) have a certain global Receiver Lift-Off (41) in a direction parallel to the Jaw Plane (27) and perpendicular to the Longitudinal Plane Face (20) of the Object (2). The B-Scan Support Jaw (26) is elevated at a Gap Distance (42) above the Longitudinal Plane Face (20) of the Object (2), which is slightly higher than the Receiver Lift-Off (41). The EMAT Receivers (E, Emi) of the Receivers Assembly (SE) are positioned below the Straight Scanning Edge (29), between the Jaw Box Bottom Wall (39) and the top of the Longitudinal Plane Face (20) of the Object (2). The EMAT Receivers (E, Emi) of the Receivers Assembly (SE) are positioned along and away from the Recess Edge (43) of the Recess (40).

Referring to FIG. 13, FIG. 14, FIG. 15, and FIG. 16, in one aspect of the invention, a Steel Slab 3D Scanner (45) is configured to sequentially scan Steel Slabs (2) of different Polygonal Section sizes in the Scanning Planes (SAP, SAPz). It includes three Transverse Movement Means (30, 30a, 30b, 30c). Each of them consists of a gear mechanism cooperating with a rack and driven by an electric motor. They are each configured to mechanically move the three B-Scan Support Jaws (26, 26a, 26b, 26c), each in a Transverse Movement Direction (31, 31a, 31b, 31c) perpendicular to the Object Axis (zz'), toward and away from the Object (2), in contact and out of contact with one of its Longitudinal Plane Faces (20, 20a, 20b, 20c, 20d).

Figure 17:
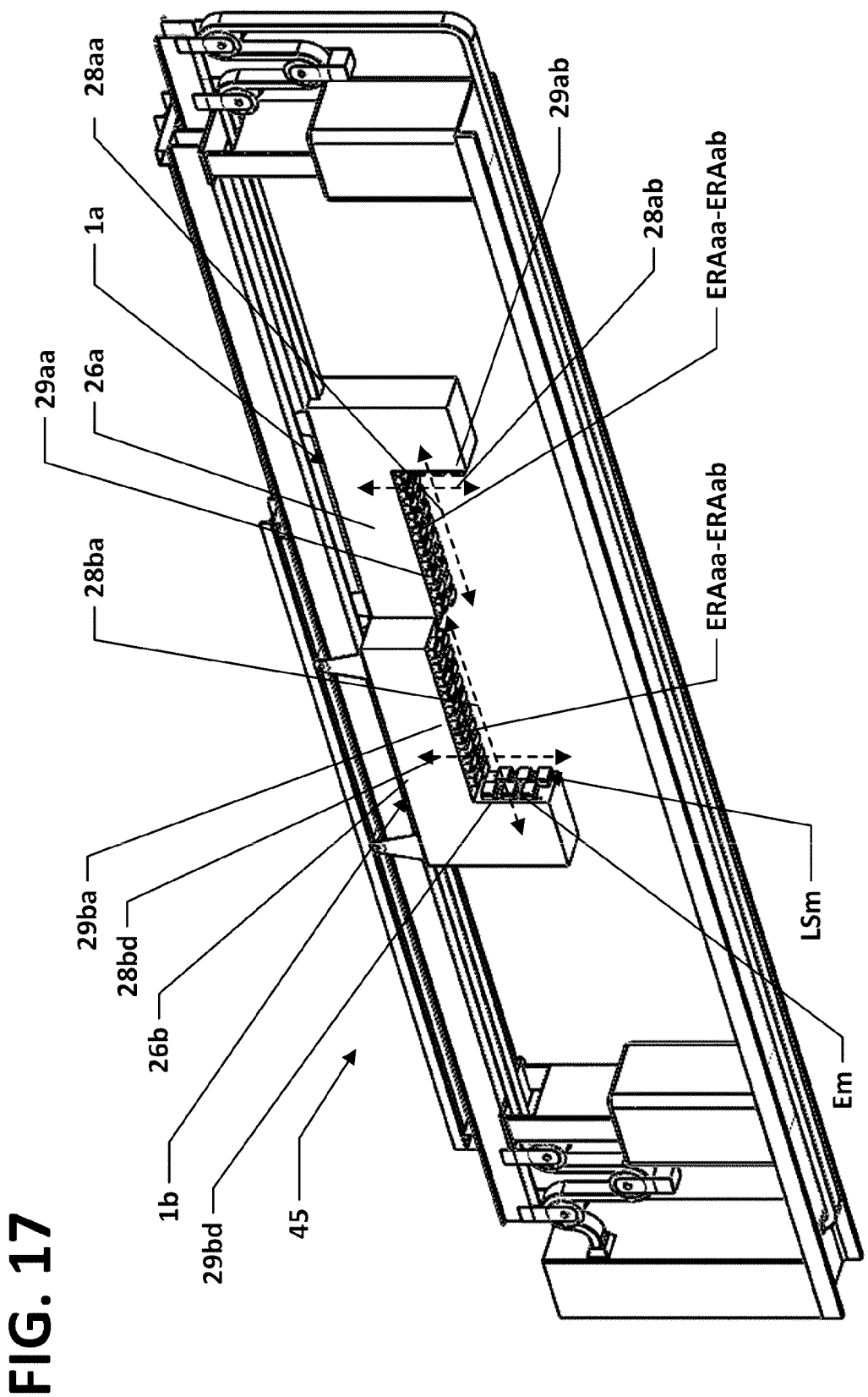
FIG. 17 is a schematic perspective front view of a recommended configuration of the Steel Slab 3D Scanner of the invention, showing in particular its upper-left angular B-Scan Support Jaw and upper-right angular B-Scan Support Jaw for B-scanning the top, left, and right faces of the steel plate.
Figure 18:
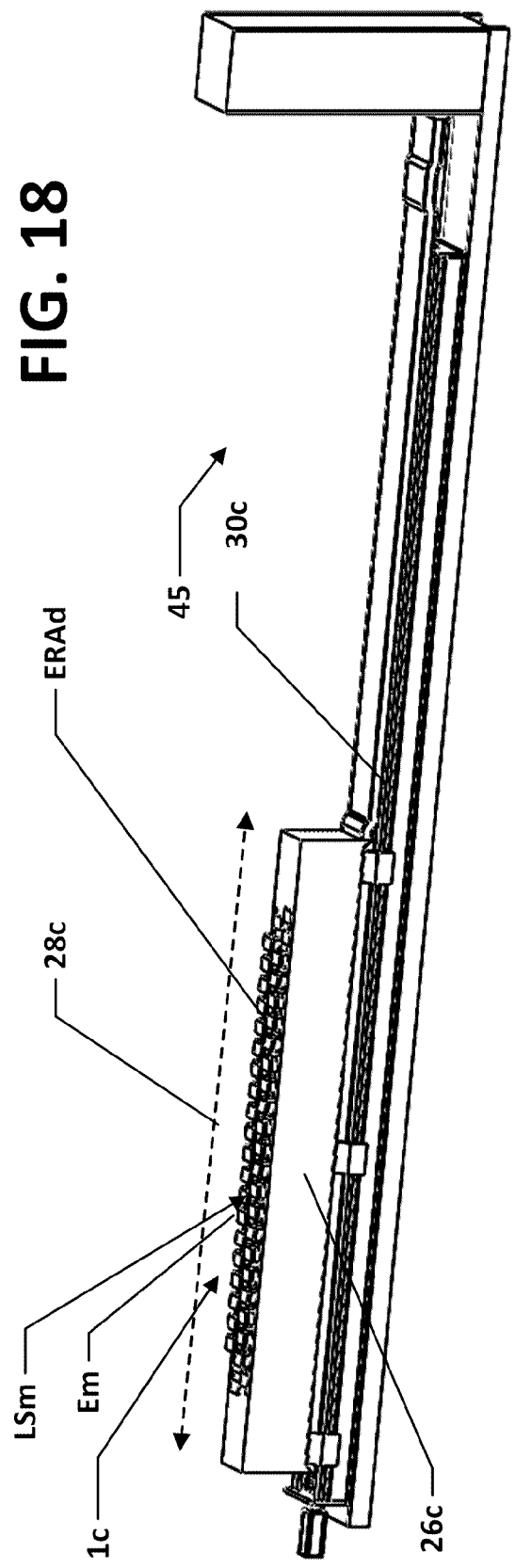
FIG. 18 is a schematic perspective front view of the Steel Slab 3D Scanner of the invention, showing in particular its lower B-Scan Support Jaw for B-scanning from the lower face of the steel plate.

FIG. 17 and FIG. 18 present two schematic perspective front views of a recommended configuration of the Steel Slab 3D Scanner (45) of the invention. It includes the combination of three UNDT Devices (1a, 1b, 1c). It is intended to perform 3D scanning from its four Longitudinal Plane Faces (20, 20a, 20b, 20c, 20d) of a Steel Slab (2) inspected at high temperature in a continuous casting line of a steel mill. Referring to FIG. 17, it can be seen that two of the UNDT Devices (1a, 1b) consist successively of an angular upper-right B-Scan Support Jaw (26a) and an angular upper-left B-Scan Support Jaw (26b) for scanning the upper and right Longitudinal Plane Faces (20a-20b) and the upper and left Longitudinal Plane Faces (20a-20d) of the Steel Slab (2), respectively. Referring to FIG. 18, it can be seen that a third UNDT Device (1c) also consists of a lower B-Scan Support Jaw (26c) for scanning the lower Longitudinal Plane Face (20c) from underneath the Steel Slab (2).

Referring to FIG. 13, in one aspect of the Steel Slab 3D Scanner (45), it is equipped with a UNDT Device (1a) formed by an angular B-Scan Support Jaw (26a). It has two non-parallel and perpendicular Scanning Directions (28aa, 28ab). The angular B-Scan Support Jaw (26a) includes two non-parallel and perpendicular Straight Scanning Edge (29aa-29ab). This angular B-Scan Support Jaw (26a) scans the upper and right Longitudinal Plane Faces (20a-20b) of the Steel Slab (2). The angular B-Scan Support Jaw (26a) is equipped with a Receivers Assembly (SEa), consisting of multiple divided EMAT Receivers (Em), divided in two groups. They are organized in such a way that their Lower Sensor Surfaces (LSm) are positioned in at least two planar EMAT Receivers Arrays (ERAaa-ERAab). Each of the two arrays is positioned on a different Control Area (CAaa-CAab) belonging to two perpendicular Longitudinal Plane Faces (20a-20b) of the Steel Slab (2). The angular B-Scan Support Jaw (26a) is equipped with an Agile Matrix Laser Transmitter (ABLATa) configured to periodically diffract a set of Pulsed Laser Output Beams (OLBk) to two planar Laser Pulses Arrays (LEAaa-LEAab) that are perpendicular and non-parallel, positioned on the two different Control Areas (CAaa-CAab) belonging to the upper and right Longitudinal Plane Faces (20a-20b) of the Steel Slab (2).

Referring to FIG. 14, in one aspect of the invention, the Steel Slab 3D Scanner (45) is equipped with a second UNDT Device (1b) consisting of a second angular B-Scan Support Jaw (26b). It scans the upper and left Longitudinal Plane Faces (20a-20d) of the Steel Slab (2). The B-Scan Support Jaw (26b) is equipped with an Agile Matrix Laser Transmitter (ABLATb) and is configured in the same way as the angular B-Scan Support Jaw (26a) described above.

Referring to FIG. 16, FIG. 17, and FIG. 18, according to one aspect of the invention, the Steel Slab 3D Scanner (45) is equipped with three UNDT Devices (1a, 1b, 1c), each equipped with a movable B-Scan Support Jaw (26a, 26b, 26c). It is also equipped with three Transverse Movement Means (30a, 30b, 30c). Each is configured to mechanically move one of the three B-Scan Support Jaws (26a, 26b, 26c) in a different Transverse Movement Direction (31a, 31b, 31c), perpendicular to a Longitudinal Plane Face (20b, 20d) of the Object (2), toward and away from the Object (2), in contact and out of contact with at least one of its Longitudinal Plane Faces (20, 20a, 20b, 20c, 20d).

Referring to FIG. 16, in combination with FIG. 17 and FIG. 18, in one aspect, the Steel Slab 3D Scanner (45) is equipped with three UNDT devices (1a, 1b, 1c). Each device includes a laterally movable B-Scan Support Jaw (26a, 26b, 26c). It is configured in such a way that the three Jaw Planes (27a, 27b, 27) of each of the three movable B-Scan Support Jaws (26a, 26b, 26c) are parallel to each other but spaced apart in the direction of the Object Axis (zz'). The three Transverse Movement Means (30a, 30b, 30c) are configured to mechanically move these three B-Scan Support Jaws (26, 26a, 26b, 26c) in three Transverse Movement Directions (31a, 31b, 31c), along the three parallel and closely spaced Translation Planes (32a, 32b, 32c) near their Jaw Planes (27a, 27b, 27c).

Figure 19:
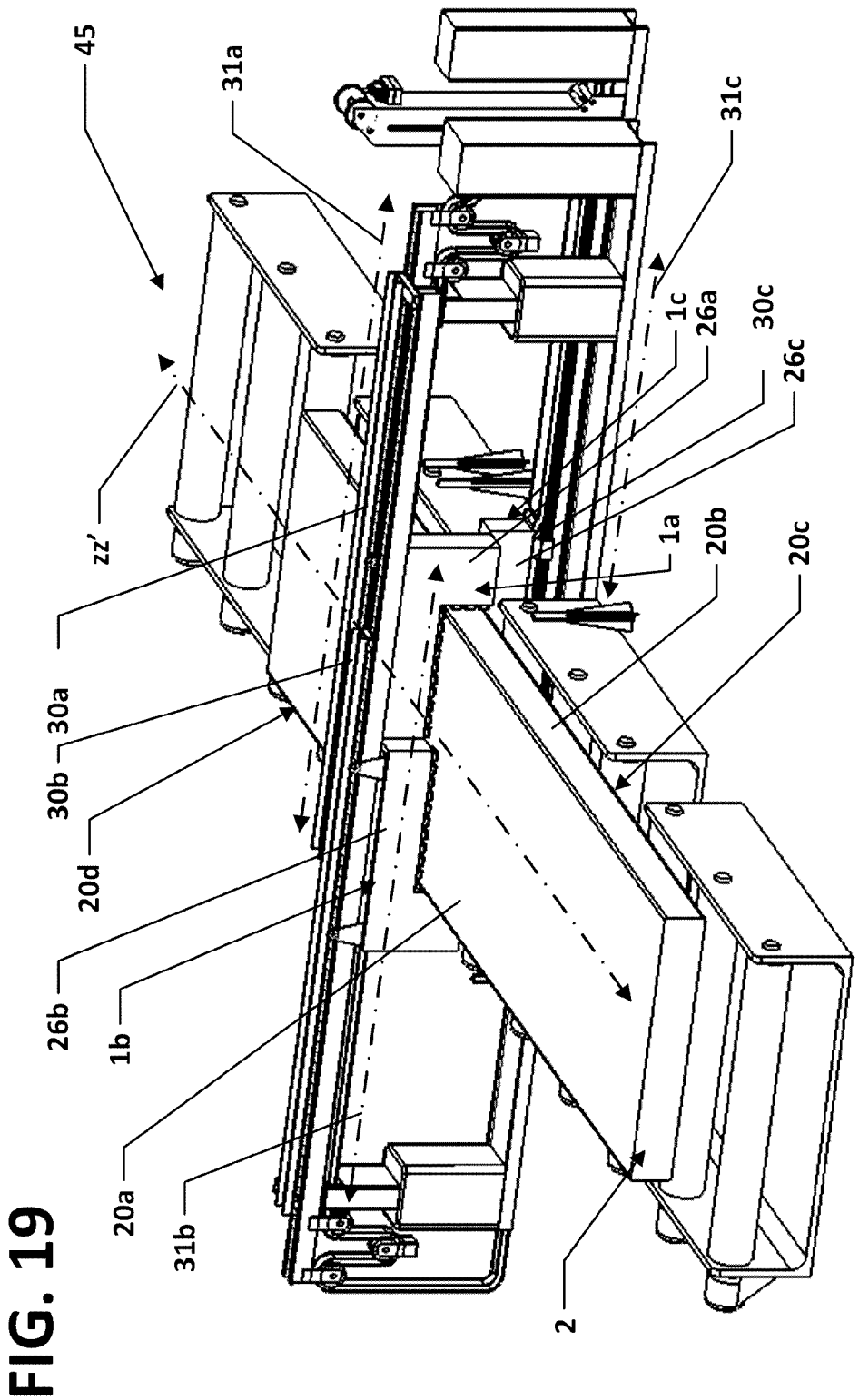
FIG. 19 is an overall schematic perspective view of a Steel Slab 3D Scanner of the invention, implemented for 3D scanning from the four faces of a continuously inspected high-temperature steel plate in a continuous casting line of a steel mill.

FIG. 19 represents a schematic perspective view of the Steel Slab 3D Scanner (45) implemented according to the invention, for 3D scanning of Steel Slabs (2) during and/or after their continuous casting at a material (M) temperature of up to 1200° C. It is dimensioned so that the scanning speed (travel speed) of the Steel Slab (2) can reach 0.150 m per second. The Steel Slab (2) can have any length. The scanned successive Steel Slabs (2) can have a variable Polygonal Section (21) from one slab to another and arbitrary transverse dimensions within the following range: a) thickness 100-250 mm, b) width 1000-2500 mm.

By a combination of three UNDT devices (1a, 1b, 1c) of the invention, each consisting of a B-Scan Support Jaw (26a, 26b, 26c) and equipped with EMAT Receivers (E, Em, Emi) of the type described in French patent application No. FR2009138, the Steel Slab 3D Scanner (45) can automatically and continuously detect any Surface Discontinuity (DS) and/or Subsurface Discontinuity (DI) in the steel Material (M), emitting a signal that is 6 dB higher than the signal of the internal structure of the Material (M) of a Steel Slab (2). This allows a continuous detection and characterization resolution of all Discontinuities (D) in the steel Material (M) with a width greater than 0.1 mm, a height greater than 0.3 mm, and a length greater than 10 mm.

Advantages of the Invention

Referring to FIG. 1, FIG. 3, and FIG. 4, it is evident that, thanks to the above-mentioned features and configuration of the UNDT device (1) of the invention, the following combined technical effects are achieved:
  a. The overall Laser Power (P) required to achieve a certain resolution of the UNDT device (1) is divided by approximately n. And the industrial production cost of the UNDT device (1) is significantly reduced.
  b. For a given Laser Power (P), the sensitivity and Signal-to-Noise Ratio (SNRki) of each waveform of A-Scan Sensor Cell Signals (ASkit) of each Detection Cell (RWi) are significantly improved.
  c. During each Scanning Cycle Period (SP), and for a given Laser Power (P), the UNDT device (1) generates a set of n2 (n×n) A-Scan Sensor Cell Signals waveforms (ASkit), resulting in an improved information density by a factor of approximately n.
  d. During each Scanning Cycle Period (SP), the combination of these n2 (instead of the commonly used n) A-Scan Sensor Cell Signals (ASkit) waveforms associated with each of the n Detection Cells (RWi), successively influenced by n Pulse Points (SPk), produces a "Photogrammetric Effect" (PE). It significantly enhances the Signal to Noise Ratio (SNR) and the accuracy of B-Scan Presentation (BS) of Discontinuities (D).
  e. During each Scanning Cycle Period (SP), this effect is particularly a result of the combination and averaging of noise from the n A-Scan Sensor Cell Signals (ASkit) waveforms emitted by an EMAT (Emi) and processed by the B-Scan Processor (BSP). This effect is much higher than if the Control Area (CA) were scanned by continuously focused pulsed laser beams in parallel, rather than by sequentially focused Pulsed Laser Output Beams (OLBk) as in the invention
  f. During each Scanning Cycle Period (SP), one of the n A-Scan Sensor Cell Signals (ASkit) (with i=k) waveforms of each Detection Cell (RWi) (i=k), corresponding to the specific Pulse Point (SPk) associated (k=i), undergoes an "Zoom Amplitude Effect" (ZAE) of Discontinuity Peaks (10) in the signal generated by the underlying Discontinuities (D) of the Detection Cell (RWi=k). This particular feature of the invention facilitates the process of the B-Scan Processor (BSP) by significantly increasing the resolution, sensitivity of B-Scan Presentations (BS), and quality of ultrasonic Scanning (S) of the UNDT device (1) for detecting and characterizing Discontinuities (D).

INDUSTRIAL APPLICATION

The invention offers valuable industrial advantages and applications in the metallurgical industry and in all fields of engineering and mechanical construction.

The invention provides industrial applications for automated non-destructive testing and 2D and/or 3D ultrasonic scanning of large metallurgical objects, particularly for continuous 3D scanning and characterization of surface and/or subsurface discontinuities of these large metal objects. The invention thus improves the quality control of metal construction parts.

Preferred industrial applications of the invention concern B-Scanning and/or C-Scanning and/or continuous high-speed 3D NDT imaging of surface and internal discontinuities in the production of large and thick metallurgical structures and/or industrial components made of conductive materials such as steel or aluminium.

A first major industrial application of the invention is the continuous 3D NDT control of Steel Slabs during their continuous casting in the severe and high-temperature (above 1000° C.) environment of a steelworks.

A second major industrial application of the invention is the generation of 3D NDT topological parameters of Steel Slab discontinuities during their continuous casting, for use in the optimal manual or automatic dynamic adjustment (said «Dynamic Soft Reduction» or DSR) of equipment parameters in the continuous casting line of a steelworks.

What is claimed is:

1. A dual matrix EMATs/Laser-Pulse UNDT Device (1) for performing an ultrasonic Scanning (S, Sz) of a conductive metallic Object (2) and identifying Discontinuities (D) in its Material (M); taken in combination with the investigated conductive metallic Object (2); comprising in combination:
   a. the conductive metallic Object (2), having a Control Area (CA) of its Surface (3) arranged along a Scanning Line (xx');
   b. a Pulsed Laser Input Source (4) producing a Pulsed Laser Input Beam (ILB);
   c. a Matrix Multi Beams Laser Transmitter of the type Agile Matrix Multi Beams Laser Transmitter (AB-LAT), powered by the Pulsed Laser Input Source (4), comprising Beams Movement Means (17, 17a), and configured,
      i. to periodically and discontinuously diffract the Pulsed Laser Input Beam (ILB) into a multitude of successive Pulsed Laser Output Beams (OLBk) according to a certain Scanning Cycle Period (SP), and,
      ii. to focus the Pulsed Laser Output Beams (OLBk) into a multitude of Pulse Points (SPk) belonging to the Surface (3) and located inside and at the center of distinct Pulse Cells (EP, EPk), each populated at its center with a Pulse Point (SPk), spatially arranged periodically, forming a Laser Pulses Array (LEA), positioned on the Control Area (CA) of the Surface (3);
   d. a Receivers Assembly (SE) consisting of a multitude of electromagnetic acoustic transducers of the type EMAT Receivers (E, Em, Emi), configured to receive Ultrasonic Waves (UW), geometrically, arranged such that
      i. the EMAT Receivers (Em, Emi) are geometrically distributed in a multitude of Sensors Groups (SGi), each consisting of one or more EMAT Receivers (E, Emi); and,
      ii. a plurality of at least three of these Sensors Groups (SGi) are each positioned inside one of the n Detection Cells (RW, RWi), spatially arranged periodically, of an EMAT Receivers Array (ERA), of matrix size (n) with n cells, positioned on the Control Area (CA) of the Surface (3) along a Detection Line (EL) parallel to the Scanning Line (xx');
wherein this UNDT Device (1) is characterized in combination in that the Agile Matrix Multi Beams Laser Transmitter (ABLAT) and the Receivers Assembly (SE) are configured such that:
   e. the EMAT Receivers Array (ERA) is parallel to the Laser Pulses Array (LEA);
   f. the Laser Pulses Array (LEA) is composed of n Pulse Cells (EPk), and the EMAT Receivers Array (ERA) is also composed of n Detection Cells (RWi), such that both are comprised of the same common number (n) of cells;
   g. the Sensors Spatial Periodicity (7) of the distances between the centers of two adjacent Detection Cells (RWi) of the EMAT Receivers Array (ERA) is similar to the Pulses Spatial Periodicity (8) of the distances between the centers of two adjacent Pulse Cells (EPk) of the Laser Pulses Array (LEA);
   h. each Pulse Cell (EPk) is geometrically associated with a neighbouring Detection Cell (RWi), and each Detection Cell (RWi) is either i) adjacent to, or overlaps with, or ii) covers at list partially its associated Pulse Cell (EPk).

2. The UNDT Device (1) according to claim 1, taken in combination with an investigated conductive metallic Object (2); characterized in that, in addition, the Matrix Multi Beams Laser Transmitter (ABLAT) and the Receivers Assembly (SE) are configured such that:
   a. the Laser Pulses Array (LEA) is parallel and contiguous to the EMAT Receivers Array (ERA);
   b. the Laser Pulses Array (LEA) and the EMAT Receivers Array (ERA), taken together, are organized in a 2-row (n×2) Matrix (11), and,
   c. each EMAT Detection Cell (RWi) is adjacent, i.e., facing and joined by its edges, to a laser Pulse Cell (EPk) in the column direction of the Matrix (11), perpendicular to the Scanning Line (xx').

3. The UNDT Device (1) according to claim 1, taken in combination with an investigated conductive metallic Object (2); characterized in that, in addition, the Agile Matrix Multi Beams Laser Transmitter (ABLAT) and the Receivers Assembly (SE) are configured such that:
   a. the Laser Pulses Array (LEA) is parallel and partially or fully overlaps the EMAT Receivers Array (ERA); and,
   b. each EMAT Detection Cell (RWi) partially overlaps a Pulse Cell (EPk) in the row direction of each Matrix (11), parallel to the Scanning Line (xx').

4. The UNDT Device (1) according to claim 1, taken in combination with an investigated conductive metallic Object (2); characterized in that, in addition:
   a. the Laser Pulses Array (LEA) and the EMAT Receivers Array (ERA) are both a single-line Matrix (n×1);
   b. the Laser Pulse Array (LEA) is parallel and partially or fully covers the EMAT Receivers Array (ERA); z
   c. the Height (12) of the EMAT Receivers Array (ERA) is equal to or greater than the Height (13) of the Laser Pulses Array (LEA) in the column direction; and,
   d. each Pulse Point (SPk) of a Pulse Cell (EPk) is adjacent to at least two associated EMAT Receivers (Em) (k=i) of its associated Detection Cell (RWi), which are arranged in a Sensors FIG. 14) surrounding the Pulse Point (SPk) of the Pulse Cell (EPk).

5. The UNDT Device (1) according to claim 1, taken in combination with an investigated conductive metallic Object (2); characterized in that:
   a. the Height (12), i.e., the transverse dimension of the EMAT Receivers Array (ERA) is greater than the Height (13), i.e., the transverse dimension of the Laser Pulse Array (LEA), with both heights measured in the column direction of matrices perpendicular to the Scanning Line (xx');
   b. each Pulse Point (SPk) of a Pulse Cell (EPk) and at least one associated EMAT Receiver (Emi) overlapping with the associated Detection Cell (RWi), are both positioned within the same Pulse Cell (EPk); and,
   c. in each pair of adjacent Pulse Cells (EPk) (i.e., side by side) of the Laser Pulse Array (LEA), an EMAT Receiver (Emi) is successively and alternately positioned Above (15) and Below (16) the Pulse Point (SPk) of that Pulse Cell (EPk) in the column direction perpendicular to the Scanning Line (xx').

* * * * *